US012291424B2

(12) United States Patent
Wu

(10) Patent No.: US 12,291,424 B2
(45) Date of Patent: May 6, 2025

(54) CALL REGISTRATION SYSTEM

(71) Applicant: Mitsubishi Electric Corporation, Tokyo (JP)

(72) Inventor: Wei Wu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1228 days.

(21) Appl. No.: 16/965,639

(22) PCT Filed: Apr. 26, 2018

(86) PCT No.: PCT/JP2018/017008
§ 371 (c)(1),
(2) Date: Jul. 29, 2020

(87) PCT Pub. No.: WO2019/207715
PCT Pub. Date: Oct. 31, 2019

(65) Prior Publication Data
US 2021/0039919 A1 Feb. 11, 2021

(51) Int. Cl.
*B66B 1/46* (2006.01)
*B66B 1/34* (2006.01)
*B66B 3/00* (2006.01)
*B66B 13/14* (2006.01)

(52) U.S. Cl.
CPC ............ *B66B 1/468* (2013.01); *B66B 1/3461* (2013.01); *B66B 3/002* (2013.01); *B66B 13/143* (2013.01);
(Continued)

(58) Field of Classification Search
CPC ....... B66B 1/468; B66B 1/3461; B66B 3/002; B66B 13/143; B66B 2201/103;
(Continued)

(56) References Cited

U.S. PATENT DOCUMENTS 6,382,363 B1 5/2002 Friedli

FOREIGN PATENT DOCUMENTS

CN 106915672 A 7/2017
JP 2005-124023 A 5/2005
(Continued)

OTHER PUBLICATIONS

Office Action issued on Feb. 18, 2022, in corresponding Chinese patent Application No. 201880092373.2, 12 pages.
(Continued)

*Primary Examiner* — Jeffrey Donels
(74) *Attorney, Agent, or Firm* — XSENSUS LLP

(57) ABSTRACT

A call registration system includes, for example, a gate (3), a security controller (4), a server (6), and a storage device (5). The security controller (4) includes, for example, a retaining unit (42), a determining unit (41), and a requesting unit (43). When the determining unit (41) determines that information concerning a selected permission floor is not retained by the retaining unit (42), the requesting unit (43) requests a group controller (1) to perform call registration for a normal use floor. When the determining unit (41) determines that the information concerning the selected permission floor is retained by the retaining unit (42), the requesting unit (43) requests the group controller (1) to perform call registration for the selected permission floor.

6 Claims, 28 Drawing Sheets

(52) U.S. Cl.
CPC . *B66B 2201/103* (2013.01); *B66B 2201/4615* (2013.01); *B66B 2201/4638* (2013.01); *B66B 2201/4653* (2013.01); *B66B 2201/4676* (2013.01)

(58) Field of Classification Search
CPC .... B66B 2201/4615; B66B 2201/4638; B66B 2201/4653; B66B 2201/4676
See application file for complete search history.

(56) References Cited

FOREIGN PATENT DOCUMENTS

| | | | | | |
|---|---|---|---|---|---|
| JP | 2007-261763 | A | | 10/2007 | |
| JP | 2008114950 | A | * | 5/2008 | |
| JP | 4636643 | B2 | | 2/2011 | |
| JP | 2012041143 | A | * | 3/2012 | |
| JP | 2014-118263 | A | | 6/2014 | |
| JP | 6037771 | B2 | | 12/2016 | |
| JP | 2017-114670 | A | | 6/2017 | |
| WO | WO-2008050416 | A1 | * | 5/2008 | ............. B66B 1/468 |
| WO | WO-2014083635 | A1 | * | 6/2014 | ............. B66B 1/468 |

OTHER PUBLICATIONS

International Search Report and Written Opinion mailed on Jun. 12, 2018 for PCT/JP2018/017008 filed on Apr. 26, 2018, 8 pages including English Translation of the International Search Report.
Office Action issued Mar. 2, 2021 in Japanese Patent Application No. 2020-515391, 10 pages.

* cited by examiner

No. 1: GROUP CONTROLLER
No. 4: SECURITY CONTROLLER
No. 6: SERVER
No. 7: CONVERSION DEVICE

No. 1: GROUP CONTROLLER
No. 10: ASSIGNING UNIT
No. 11: OPERATION MANAGING UNIT
No. 12: INFORMATION PROVIDING UNIT

No. 4: SECURITY CONTROLLER
No. 40: DETERMINING UNIT
No. 41: DETERMINING UNIT
No. 42: RETAINING UNIT
No. 43: REQUESTING UNIT
No. 44: DISPLAY CONTROL UNIT
No. 45: OPERATION CONTROL UNIT
No. 46: DETERMINING UNIT
No. 47: IMPARTING UNIT
No. 48: LIST ACQUIRING UNIT
No. 49: DETERMINING UNIT

No. 6: SERVER
No. 60: DETERMINING UNIT
No. 61: DISPLAY CONTROL UNIT
No. 62: COMMUNICATION CONTROL UNIT
No. 63: SPECIFYING UNIT
No. 64: SPECIFYING UNIT
No. 65: REQUESTING UNIT

S101: IDENTIFICATION INFORMATION RECEIVED?
S102: MATCH?
S103: PASSAGE IS PERMITTED
S104: DESTINATION CHANGE REQUEST RETAINED?
S105: DETERMINE NORMAL USE FLOOR AS DESTINATION FLOOR
S106: DETERMINE ONE OF PERMISSION FLOORS AS DESTINATION FLOOR
S107: REQUEST CALL REGISTRATION
S108: ASSIGNED CAR INFORMATION RECEIVED?
S109: DISPLAY ASSIGNED CAR INFORMATION
S110: PASSAGE IS NOT PERMITTED

S201: CALL REGISTRATION REQUEST RECEIVED?
S202: DETERMINE ASSIGNED CAR
S203: TRANSMIT ASSIGNMENT INFORMATION
S204: TRANSMIT ASSIGNED CAR INFORMATION

S301: PORTABLE TERMINAL CONNECTED?
S302: AUTHENTICATED?
S303: DISPLAY INPUT SCREEN
S304: INPUT INFORMATION RECEIVED?
S305: TRANSMIT INPUT INFORMATION
S306: COLLATION SUCCESSFUL?
S307: DISPLAY ERROR SCREEN
S308: TRANSMIT TOKEN
S309: DISPLAY MENU SCREEN

S401: INPUT INFORMATION RECEIVED?
S402: MATCH?
S403: TRANSMIT FAILURE INFORMATION
S404: TRANSMIT TOKEN

91a: DESTINATION CHANGE
91b: STATE CONFIRMATION

S501: PERMISSION FLOOR LIST ACQUISITION REQUEST RECEIVED?
S502: TRANSMIT PERMISSION FLOOR LIST ACQUISITION REQUEST
S503: PERMISSION FLOOR LIST RECEIVED?
S504: DISPLAY SELECTION SCREEN
S505: DESTINATION CHANGE REQUEST RECEIVED?
S506: TRANSMIT DESTINATION CHANGE REQUEST

S601: PERMISSION FLOOR LIST ACQUISITION REQUEST RECEIVED?
S602: ACQUIRE PERMISSION FLOOR LIST
S603: TRANSMIT PERMISSION FLOOR LIST
S604: DESTINATION CHANGE REQUEST RECEIVED?
S605: RETAIN DESTINATION CHANGE REQUEST

S701: STATE CONFIRMATION REQUEST RECEIVED?
S702: SPECIFY ASSIGNED CAR
S703: SPECIFY STATE OF ASSIGNED CAR
S704: DISPLAY STATE CONFIRMATION SCREEN

91a: DESTINATION CHANGE
91b: STATE CONFIRMATION
91c: ROUTE DESIGNATION

S801: ROUTE DESIGNATION REQUEST RECEIVED?
S802: TRANSMIT ROUTE DESIGNATION REQUEST
S803: SECURITY LEVEL?
S804: DISPLAY ERROR SCREEN
S805: DISPLAY ROUTE DESIGNATION SCREEN
S806: ROUTE CHANGE REQUEST RECEIVED?
S807: REQUEST CALL REGISTRATION
S808: ASSIGNED CAR INFORMATION RECEIVED?
S809: DISPLAY ASSIGNED CAR INFORMATION

S901: ROUTE DESIGNATION REQUEST RECEIVED?
S902: SECURITY LEVEL?
S903: TRANSMIT LEVEL 1 INFORMATION
S904: ACQUIRE PERMISSION FLOOR LIST
S905: TRANSMIT PERMISSION FLOOR LIST

S121: IDENTIFICATION INFORMATION RECEIVED?
S122: MATCH?
S123: PASSAGE IS PERMITTED
S124: DESTINATION CHANGE REQUEST RETAINED?
S125: DETERMINE ONE OF PERMISSION FLOORS AS DESTINATION FLOOR
S126: REQUEST CALL REGISTRATION
S127: ASSIGNED CAR INFORMATION RECEIVED?
S128: DISPLAY ASSIGNED CAR INFORMATION
S129: PASSAGE IS NOT PERMITTED

CALL REGISTRATION SYSTEM

CROSS-REFERENCE TO RELATED APPLICATION

The present application is based on PCT filing PCT/JP2018/017008, filed Apr. 26, 2018, the entire contents of which are incorporated herein by reference.

FIELD

The present invention relates to a call registration system.

BACKGROUND

PTL 1 describes an elevator group control system. In the system described in PTL 1, a user can register a call by operating a portable terminal.

CITATION LIST

Patent Literature

[PTL 1] JP 2014-118263 A

SUMMARY

Technical Problem

In the system described in PTL 1, anybody can register a call by installing a dedicated application in a portable terminal.

In a building, an area where only predetermined people are permitted to enter is sometimes set. When the system described in PTL 1 is applied to the building where such security control is performed, a call can be registered even from the outside of the area using a portable terminal, and then a car is assigned to the call. On the other hand, if use of portable terminals is allowed only in the area, there is a problem in that convenience is deteriorated.

The present invention is made in order to solve such a problem. An object of the present invention is to provide a call registration system that can register a call without spoiling convenience in a building or the like where security control is performed.

Solution to Problem

A call registration system of the present invention comprises a collation device including a first reader, a security controller that controls the collation device, a server that communicates with the security controller, and a storage device that stores information concerning a normal use floor, information concerning a plurality of permission floors, and authentication information in association with specific identification information. The server includes first display control means for causing a portable terminal to display an input screen. The security controller includes imparting means for, when information input on the input screen matches the authentication information, imparting authorization information corresponding to the identification information to the portable terminal via the server. The first display control means causes the portable terminal, to which the authorization information is imparted, to display a selection screen for selecting one out of the plurality of permission floors. The security controller further includes retaining means for retaining information concerning a permission floor selected on the selection screen, first determining means for, when information read by the first reader matches the identification information, determining whether information concerning the selected permission floor is retained by the retaining means, and first requesting means for, when the first determining means determines that the information concerning the selected permission floor is not retained by the retaining means, requesting an elevator group controller to perform call registration for the normal use floor and, when the first determining means determines that the information concerning the selected permission floor is retained by the retaining means, requesting the group controller to perform call registration for the selected permission floor.

Advantageous Effects of Invention

The call registration system according to the present invention includes a collation device, a security controller, a server, and a storage device. The security controller includes first requesting means. When first determining means determines that information concerning a selected permission floor is not retained by retaining means, the first requesting means requests an elevator group controller to perform call registration for a normal use floor. When the first determining means determines that the information concerning the selected permission floor is retained by the retaining means, the first requesting means requests the group controller to perform the call registration for the selected permission floor. With the call registration system according to the present invention, it is possible to register a call without spoiling convenience in a building or the like where security control is performed.

DESCRIPTION OF EMBODIMENTS

Figure 1:
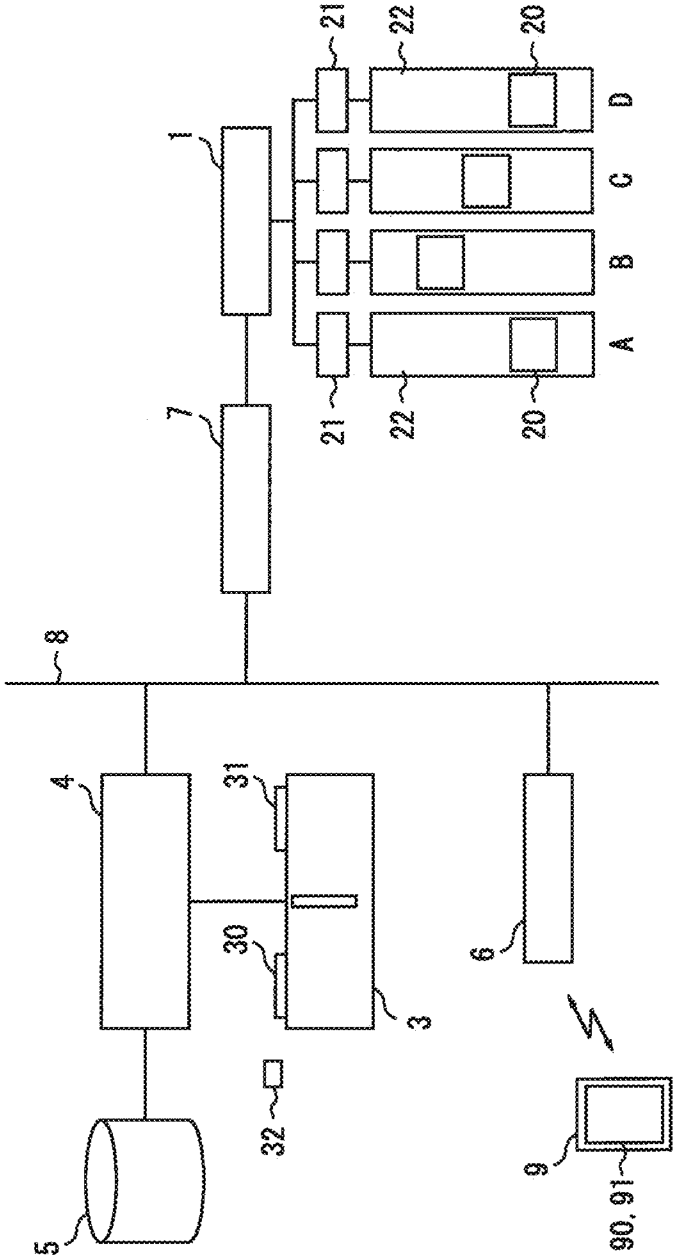
FIG. 1 is a diagram showing an example of a call registration system according to a first embodiment.

The present invention is explained with reference to the accompanying drawings. Redundant descriptions are simplified or omitted as appropriate. In the drawings, the same signs indicate the same or corresponding parts.

First Embodiment

FIG. 1 is a diagram showing an example of a call registration system according to a first embodiment. The call registration system includes, for example, a group controller 1, a gate 3, a security controller 4, a storage device 5, a server 6, and a conversion device 7.

For example, the group controller 1 controls, as a group, a plurality of elevators provided in a certain building. In this embodiment, as an example, an example in which the group controller 1 controls four elevators is explained. For example, the group controller 1 controls an elevator A to an elevator D. Each elevator includes a car 20 and a controller 21. The car 20 moves up and down in a shaft 22. The controller 21 controls operations of the car 20 on the basis of assignment information from the group controller 1.

In the building including the elevator A to the elevator D, an area where only predetermined people are permitted to enter is set. In the following explanation, the area is described as a restricted area as well. The elevator A to the elevator D are present in the restricted area. For example, when a shopping area and an office area are present in the building, the office area is set as the restricted area. Basically, people other than those concerned are not allowed to enter and exit the office area. The elevator A to the elevator D are used by, for example, those concerned of companies having offices in the office area.

The gate 3 is an example of a collation device. The gate 3 is installed in a place where a person entering the restricted area has to always pass. In the following explanation, a person permitted to enter the restricted area is described as a passage permitted person as well. The passage permitted person cannot enter the restricted area unless the passage permitted person passes through the gate 3. Further, the gate 3 may be installed in a place where the passage permitted person has to always pass when exiting the restricted area.

The gate 3 is installed in, for example, a lobby floor of the building. The lobby floor is, for example, a first floor. A hall for boarding the car 20 is provided in the first floor of the building. For example, the gate 3 is provided in a passage leading to the hall.

The gate 3 includes, for example, a reader 30 and a display device 31. The reader 30 reads identification information from a storage medium such as an employee ID card. In the following explanation, an example in which the reader 30 reads identification information from a card 32 is explained. For example, the card 32 is owned by the passage permitted person. Peculiar identification information is stored in the card 32. If the card 32 is the employee ID card, the identification information may be an employee number of an owner of the card 32. When offices of a plurality of companies are present in the restricted area, the identification information may be a combination of a number representing a company and an employee number. When the card 32 is placed in a position where a radio wave from the reader 30 reaches, the identification information stored in the card 32 is read by the reader 30. The display device 31 provides information to a person passing or a person about to pass through the gate 3.

The security controller 4 controls the gate 3. For example, the security controller 4 controls a plurality of gates 3 on the basis of information stored in the storage device 5. The function of the storage device 5 may be included in the security controller 4. Table 1 shows an example of the information stored in the storage device 5.

TABLE 1

| Passage permitted person | Identification information | Normal use floor | Permission floor | Collation information User ID | Collation information Password |
|---|---|---|---|---|---|
| P1 | 11001 | 8 | 1, 2, 3, 7, 8, 9 | abcde | 12345 |
| P2 | 11002 | 8 | 1, 7, 8, 9 | fghij | 67891 |
| P3 | 11003 | 15 | 1, 14, 15 | klmno | 01112 |
| . | . | . | . | . | . |
| . | . | . | . | . | . |
| . | . | . | . | . | . |

Table 1 shows an example in which identification information, information concerning a normal use floor, information concerning permission floors, and collation information are stored in the storage device 5 for each passage permitted person. In the example shown in Table 1, the collation information includes a user ID and a password. The permission floors include, for example, a floor where the gate 3 is installed and the normal use floor.

For example, identification information "11001" is stored in the card 32 owned by a passage permitted person P1. In the example shown in Table 1, information concerning a normal use floor "eighth floor" is stored in the storage device 5 in association with the identification information "11001". The normal use floor is a floor that the passage permitted person always uses as a destination floor. Table 1 shows an example in which an office of the passage permitted person P1 is present in the eighth floor and the passage permitted person P1 goes to the eighth floor when coming to work if the passage permitted person P1 has nothing else to do.

Information concerning permission floors "first floor, second floor, third floor, seventh floor, eighth floor, and ninth floor" is stored in the storage device 5 in association with the identification information "11001". The permission floors are floors to which the passage permitted person is permitted to go. That is, the passage permitted person P1 is permitted in advance to go to the first floor, the second floor, the third floor, the seventh floor, the eighth floor, and the ninth floor.

A user ID "abcde" and a password "12345" are stored in the storage device 5 in association with the identification information "11001". The collation information is information registered in advance by the passage permitted person in order to use a portable terminal 9. In this way, the identification information, the information concerning the normal use floor, the information concerning the plurality of permission floors, and the collation information are stored in the storage device 5 in association with each piece of the identification information.

The server 6 is connected to, for example, a network 8 in the building. The server 6 communicates with the security controller 4 via the network 8. The group controller 1 is connected to the network 8 via the conversion device 7. The server 6 is capable of communicating with the group controller 1 via the conversion device 7. The security controller 4 is capable of communicating with the group controller 1 via the conversion device 7.

The server 6 communicates with the portable terminal 9. The portable terminal 9 is a terminal owned by the passage permitted person. The portable terminal 9 is, for example, a smartphone. The passage permitted person can access the server 6 from the portable terminal 9 via, for example, the Internet line. The portable terminal 9 includes, for example, a display device 90 and an input device 91. The display device 90 and the input device 91 are realized by, for example, a touch panel.

Figure 2:
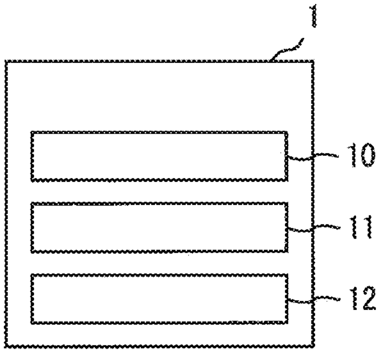
FIG. 2 is a diagram showing an example of a group controller.

FIG. 2 is a diagram showing an example of the group controller 1. The group controller 1 includes, for example, an assigning unit 10, an operation managing unit 11, and an information providing unit 12.

Figure 3:
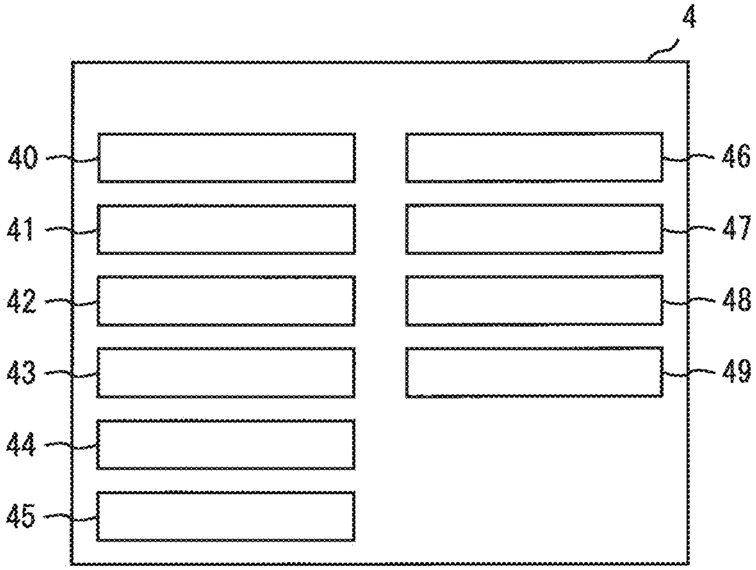
FIG. 3 is a diagram showing an example of a security controller.

FIG. 3 is a diagram showing an example of the security controller 4. The security controller 4 includes, for example, a determining unit 40, a determining unit 41, a retaining unit 42, a requesting unit 43, a display control unit 44, an operation control unit 45, a determining unit 46, an imparting unit 47, a list acquiring unit 48, and a determining unit 49. The display control unit 44 controls the display device 31 of the gate 3. The operation control unit 45 controls, for example, movement of a bar of the gate 3.

Figure 4:
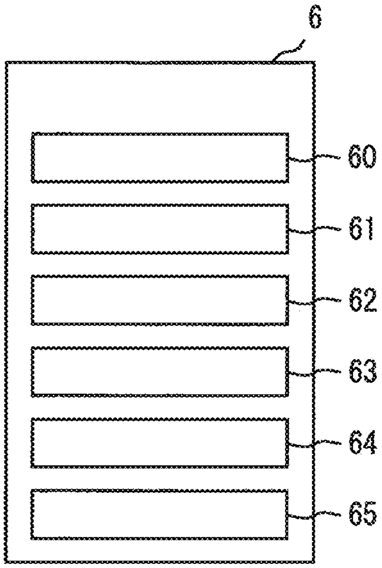
FIG. 4 is a diagram showing an example of a server.

FIG. 4 is a diagram showing an example of the server 6. The server 6 includes, for example, a determining unit 60, a display control unit 61, a communication control unit 62, a specifying unit 63, a specifying unit 64, and a requesting unit 65.

Functions of the call registration system are explained below with reference to FIG. 5 to FIG. 15 as well. In the following explanation, an example is explained in detail in which the passage permitted person P1 uses this system. It is assumed that the information shown in Table 1 is stored in the storage device 5.

First, an example in which the passage permitted person P1 goes to an office of the passage permitted person P1 when coming to work is explained. As explained above, the office of the passage permitted person P1 is present in the eighth floor of the building. The passage permitted person P1 owns the card 32 in which the identification information "11001" is stored. In the following explanation, a card owned by the passage permitted person P1 is described as a card 32*a* according to necessity to distinguish the card from the other cards 32.

Figure 5:
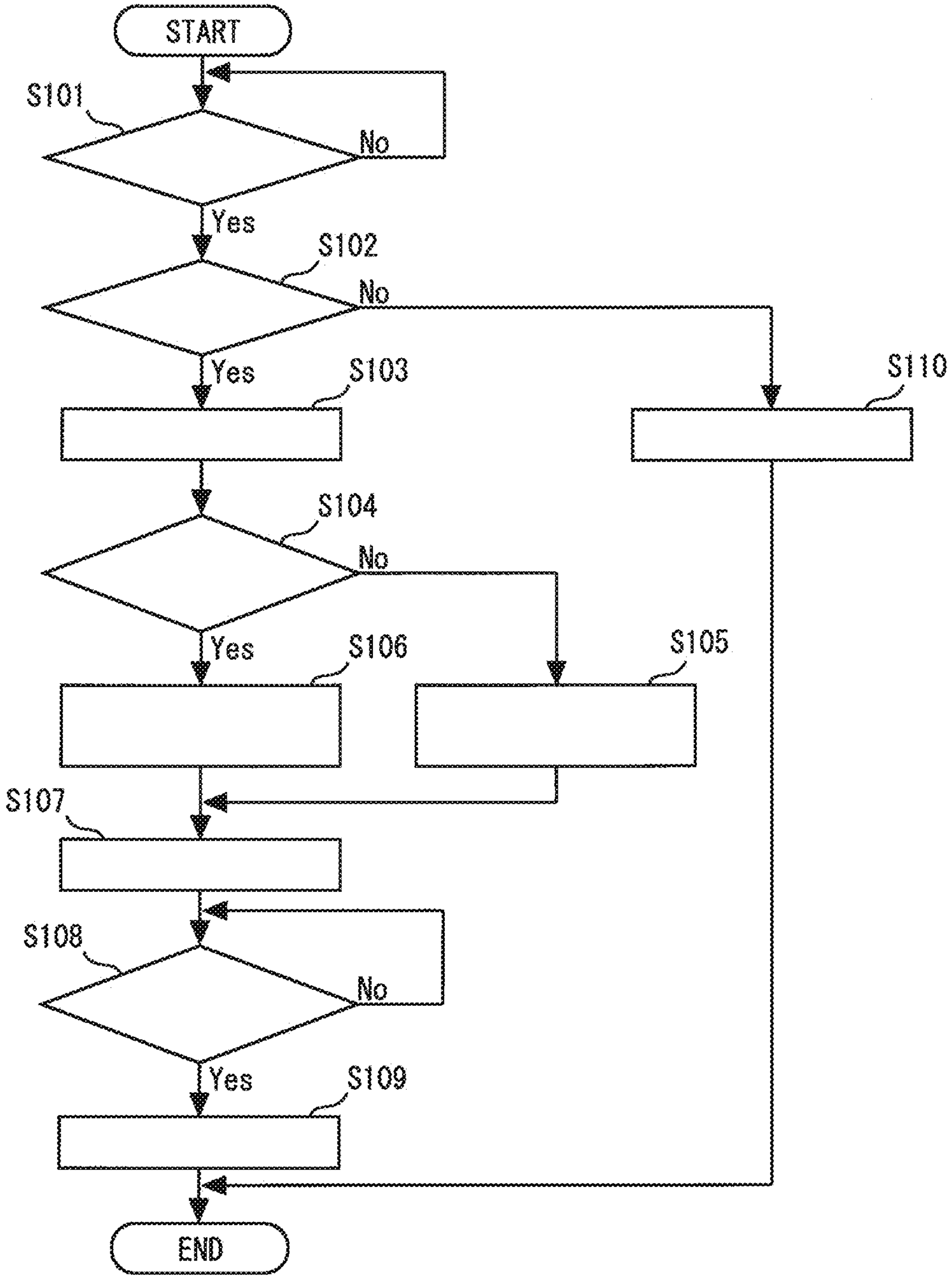
FIG. 5 is a flowchart showing an operation example of the security controller.
Figure 6:
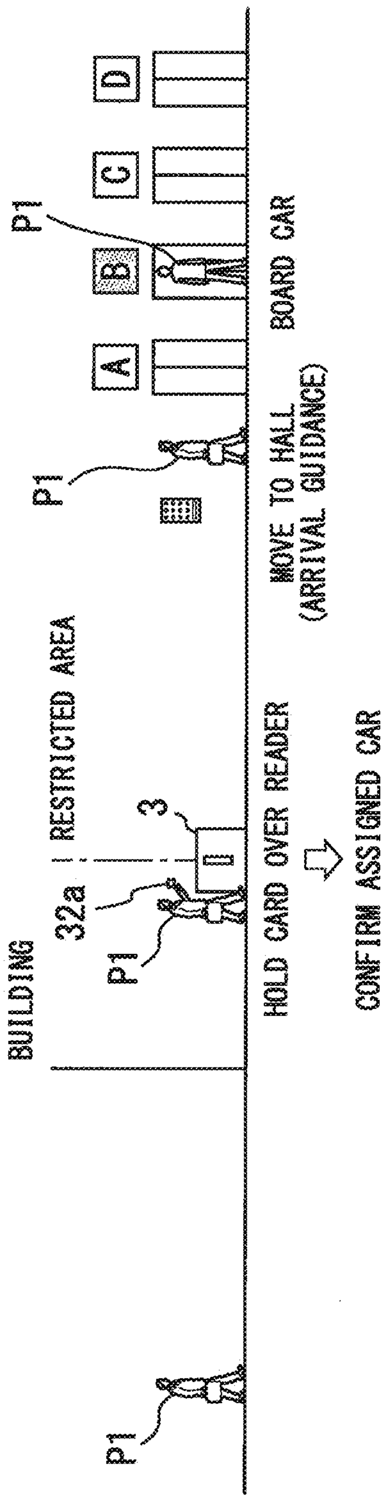
FIG. 6 is a diagram for explaining an example of actions performed by a passage permitted person when coming to work.

FIG. 5 is a flowchart showing an operation example of the security controller 4. FIG. 6 is a diagram for explaining an example of actions performed by the passage permitted person P1 when coming to work. In the security controller 4, it is determined whether identification information is received from the gate 3 (S101).

For example, the passage permitted person P1 holds the card 32*a* over the reader 30 of the gate 3 when coming to work. Consequently, the reader 30 reads the identification information "11001" from the card 32*a*. The information read by the reader 30 is transmitted to the security controller 4. When the security controller 4 receives, from the gate 3, the information read by the reader 30, it is determined Yes in S101.

The determining unit 40 determines whether the information read by the reader 30 matches any of the identification information stored in the storage device 5 (S102). When a person holding the card 32 over the reader 30 is not a passage permitted person, it is determined No in S102. When it is determined No in S102, passage through the gate 3 is not permitted (S110). For example, the operation control unit 45 does not open the bar of the gate 3. The display control unit 44 causes the display device 31 to display to the effect that passage is not permitted.

The identification information "11001" stored in the card 32*a* is stored in the storage device 5. Accordingly, when the passage permitted person P1 holds the card 32*a* over the reader 30, it is determined Yes in S102. When it is determined Yes in S102, passage through the gate 3 is permitted (S103). For example, the operation control unit 45 opens the bar of the gate 3.

When the determining unit 40 determines that the information read by the reader 30 matches the identification information stored in the storage device 5, the determining unit 41 determines a destination floor of the passage permitted person. For example, the determining unit 41 selects, as the destination floor, one floor among the normal use floor and the permission floors stored in the storage device 5. When determining the destination floor corresponding to the identification information "11001", the determining unit 41 selects, as the destination floor, one floor among the first floor, the second floor, the third floor, the seventh floor, the eighth floor, and the ninth floor.

Specifically, the determining unit 41 determines whether a destination change request is retained by the retaining unit 42 (S104). For example, the passage permitted person P1 can cause the retaining unit 42 to retain the destination change request by performing specific operation on the portable terminal 9 before holding the card 32*a* over the reader 30. If the passage permitted person P1 does not perform the specific operation on the portable terminal 9, it is determined No in S104. When determining No in S104, the determining unit 41 determines, as the destination floor, the normal use floor stored in the storage device 5 (S105). For example, in S105, the determining unit 41 determines that the destination floor corresponding to the identification information "11001" is the eighth floor.

The requesting unit 43 requests the group controller 1 to perform call registration for the destination floor determined by the determining unit 41 (S107). When the determining unit 41 determines No in S104, the requesting unit 43 requests the group controller 1 to perform call registration for the normal use floor. This request includes, for example, the identification information "11001", information concerning a boarding floor "first floor", and information concerning the destination floor "eighth floor". The boarding floor is, for example, a floor where the gate 3 is installed.

Figure 7:
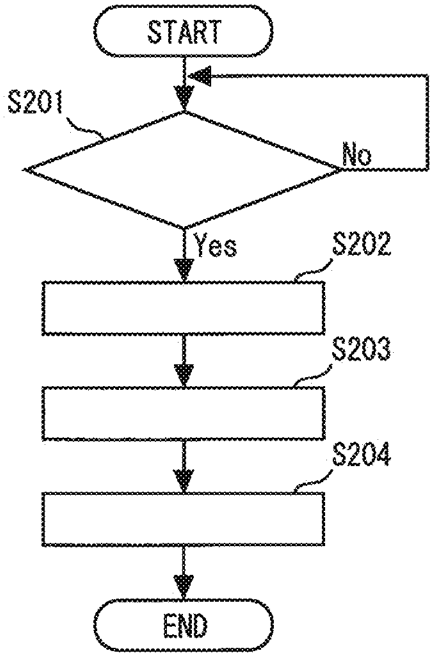
FIG. 7 is a flowchart showing an operation example of the group controller.

FIG. 7 is a flowchart showing an operation example of the group controller 1. The group controller 1 determines whether a request for call registration is received (S201). When the group controller 1 receives the request transmitted by the requesting unit 43 in S107, it is determined Yes in S201. When it is determined Yes in S201, the assigning unit 10 determines the car 20 assigned to the request (S202). In the example explained in this embodiment, the assigning unit 10 determines, on the basis of a calculated evaluation value and the like, an assigned car out of the car 20 of the elevator A, the car 20 of the elevator B, the car 20 of the elevator C, and the car 20 of the elevator D.

In the following explanation, to simplify description, the car 20 and the controller 21 of the elevator A are described as a car 20A and a controller 21A as well. Similarly, the car 20 and the controller 21 of the elevator B are described as a car 20B and a controller 21B as well. The car 20 and the controller 21 of the elevator C are described as a car 20C and a controller 21C as well. The car 20 and the controller 21 of the elevator D are described as a car 20D and a controller 21D as well.

When the assigning unit 10 determines the assigned car in response to the call registration request, the operation managing unit 11 transmits assignment information to the controller 21 that controls the assigned car (S203). For example, when the assigning unit 10 determines the car 20B as the assigned car, the operation managing unit 11 transmits, to the controller 21B, assignment information indicating that the boarding floor is the first floor and the destination floor is the eighth floor. When receiving the assignment information, the controller 21B registers a call indicating that the boarding floor is the first floor and the destination floor is the eighth floor. The controller 21B causes the car 20B to respond to the registered call.

When the assigning unit 10 determines the assigned car in response to the call registration request, the information providing unit 12 transmits information concerning the assigned car to a request source of the call registration (S204). For example, the information providing unit 12 transmits, to the security controller 4, information to the effect that the assigned car corresponding to the identification information "11001" is the car 20B.

In the security controller 4, when the requesting unit 43 requests the call registration in S107, it is determined whether the information concerning the assigned car is received from the group controller 1 as a response to the request (S108). When the security controller 4 receives the information concerning the assigned car transmitted by the information providing unit 12 in S204, it is determined Yes in S108. When it is determined Yes in S108, the display control unit 44 causes the display device 31 to display the received information concerning the assigned car (S109). The passage permitted person P1 can learn, by viewing the display device 31 when passing through the gate 3, the car 20 that the passage permitted person P1 should board. For example, "B" indicating the elevator B is displayed on the display device 31. The passage permitted person P1 moves to the hall after passing through the gate 3 and boards the car 20B from a door, above which "B" is displayed.

Figure 8:
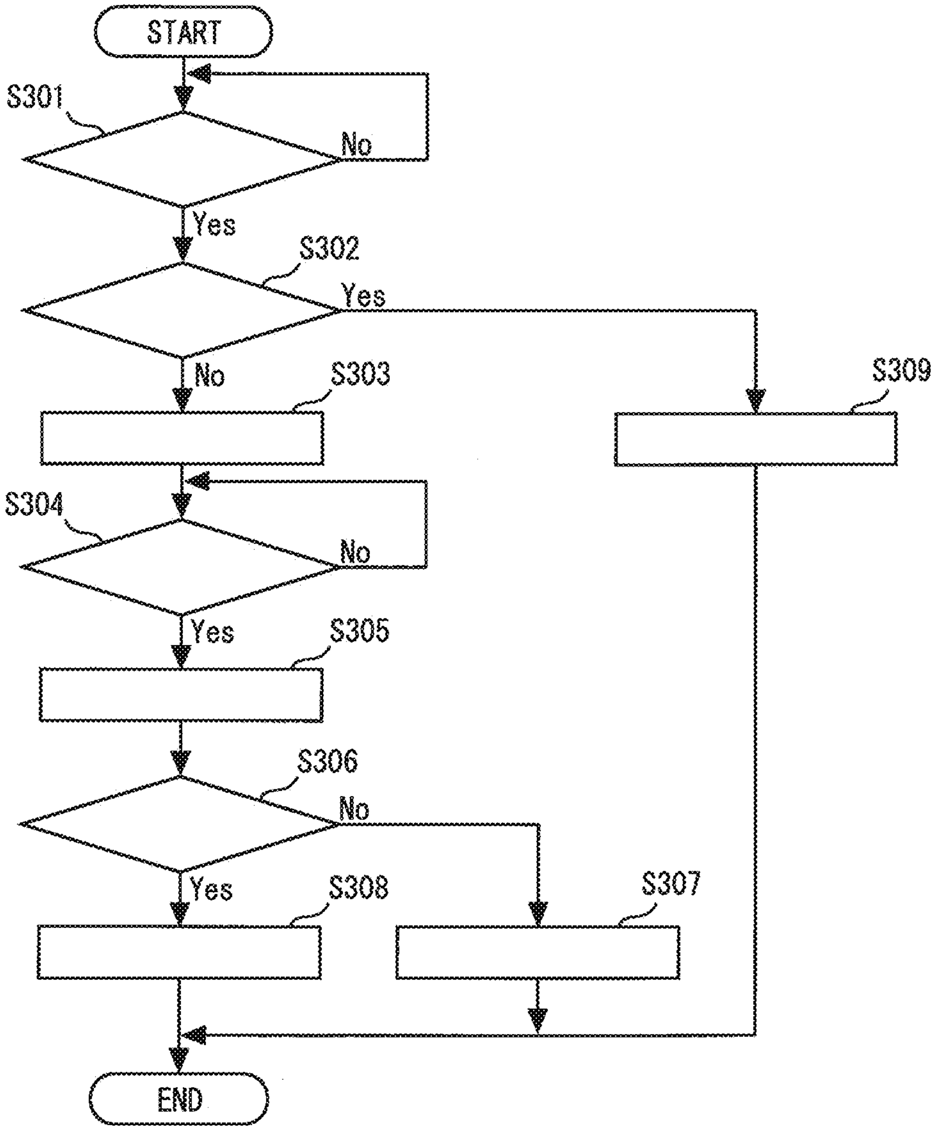
FIG. 8 is a flowchart showing an operation example of the server.
Figure 9:
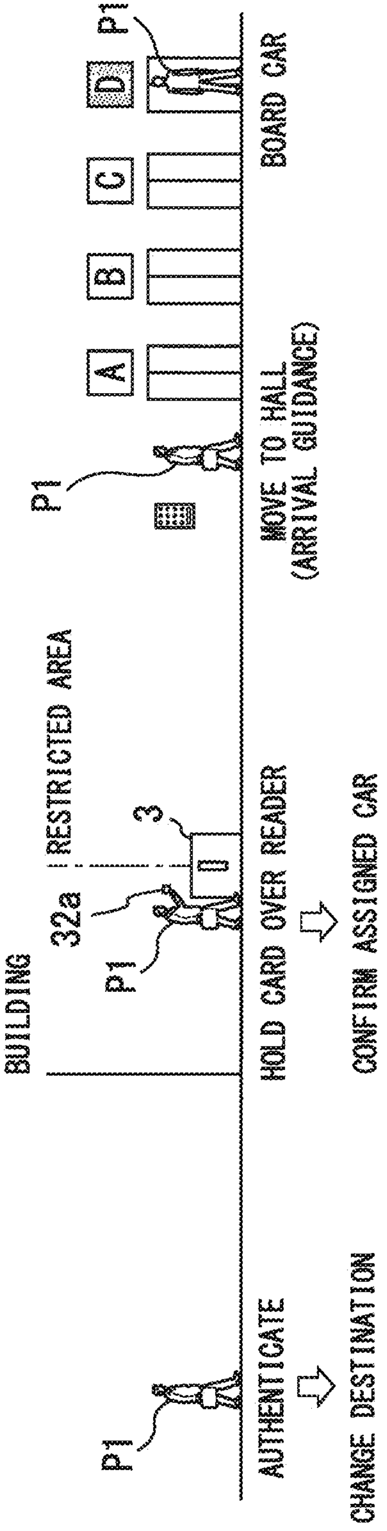
FIG. 9 is a diagram for explaining another example of actions performed by the passage permitted person when coming to work.

Next, an example in which the passage permitted person P1 stops by somewhere in a floor, which is not the normal use floor, when coming to work is explained. FIG. 8 is a flowchart showing an operation example of the server 6. FIG. 9 is a diagram for explaining another example of actions performed by the passage permitted person P1 when coming to work. In the server 6, it is determined whether the portable terminal 9 is connected (S301). The portable terminal 9 is connectable to the server 6 via, for example, the Internet line. For example, the passage permitted person P1 operates the portable terminal 9 before entering the restricted area and connects the portable terminal 9 to the server 6.

When the portable terminal 9 is connected to the server 6 (Yes in S301), the determining unit 60 determines whether the portable terminal 9 is already authenticated (S302). For example, if a token issued by the security controller 4 is not saved in a cache of a browser of the portable terminal 9 connected to the server 6, it is determined No in S302. Note that the token is explained below. When it is determined No in S302, the display control unit 61 causes the display device 90 of the portable terminal 9 to display an input screen for causing the passage permitted person P1 to input a user ID and a password (S303).

Figure 10:
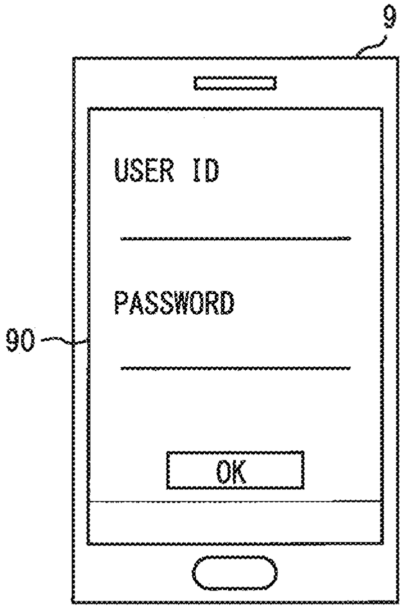
FIG. 10 is a diagram showing an example of a portable terminal, on a display device of which an input screen is displayed.

FIG. 10 is a diagram showing an example of the portable terminal 9, on the display device 90 of which the input screen is displayed. For example, the passage permitted person P1 inputs the user ID and the password on the input screen using the input device 91. In the example shown in FIG. 10, the passage permitted person P1 presses an OK button displayed on the input screen, whereby input information, that is, the input user ID and the input password are transmitted from the portable terminal 9 to the server 6.

In the server 6, when the display control unit 61 causes the portable terminal 9 to display the input screen, it is determined whether the input information is received from the portable terminal 9 (S304). When the server 6 receives, from the portable terminal 9, the information input on the input screen, it is determined Yes in S304. When it is determined Yes in S304, the communication control unit 62 transmits the received input information to the security controller 4 (S305).

Figure 11:
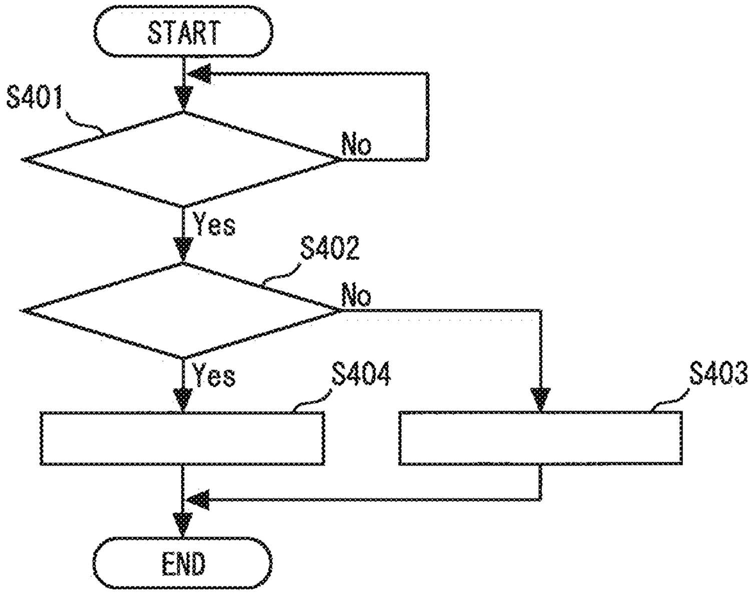
FIG. 11 is a flowchart showing another operation example of the security controller.

FIG. 11 is a flowchart showing another operation example of the security controller 4. In the security controller 4, it is determined whether the information input on the input screen is received from the server 6 (S401). When the security controller 4 receives the input information transmitted by the communication control unit 62 in S305, it is determined Yes in S401. When it is determined Yes in S401, the determining unit 46 determines whether the information input on the input screen matches any of the collation information stored in the storage device 5 (S402). When the information input on the input screen matches none of the collation information stored in the storage device 5 (No in S402), the determining unit 46 transmits failure information indicating failure of collation to the server 6 (S403).

On the other hand, when the information input on the input screen matches any of the collation information stored in the storage device 5 (Yes in S402), the imparting unit 47 imparts authorization information corresponding to the identification information to the portable terminal 9 via the server 6. For example, the passage permitted person P1 inputs the user ID "abcde" and the password "12345" on the input screen and presses the OK button. Consequently, in S402, the determining unit 46 determines that the information input on the input screen matches the collation information of the identification information "11001". In such a case, the imparting unit 47 imparts authorization information corresponding to the identification information "11001" to the portable terminal 9 via the server 6. In this explanation, this authorization information is referred to as a token as well. In the example explained above, the token includes information indicating login from a specific portable terminal 9 is successful concerning the identification information "11001". When it is determined Yes in S402, the imparting unit 47 issues the token and transmits the token to the server 6 (S404).

In the server 6, when the communication control unit 62 transmits the input information to the security controller 4 in S305, it is determined whether the collation is successful (S306). When the server 6 receives the failure information transmitted by the determining unit 46 in S403, it is determined No in S306. When it is determined No in S306, the display control unit 61 causes the display device 90 of the portable terminal 9 to display, for example, an error screen (S307).

On the other hand, when the server 6 receives the token issued by the imparting unit 47 in S404, it is determined Yes in S306. When it is determined Yes in S306, the communication control unit 62 transmits the received token to the portable terminal 9 that transmitted the input information in S304 (S308). Consequently, the token issued by the imparting unit 47 in S404 is saved in the portable terminal 9 of the passage permitted person P1. For example, the token is saved in the cache of the browser of the portable terminal 9. In the following explanation, a portable terminal owned by the passage permitted person P1 and in a state in which the token is saved in a cache of a browser is described as a portable terminal 9*a* as well.

When the portable terminal 9*a* is connected to the server 6 (Yes in S301), it is determined Yes in S302. When it is determined Yes in S302, the display control unit 61 causes the display device 90 of the portable terminal 9*a* to display, for example, a menu screen (S309).

Figure 12:
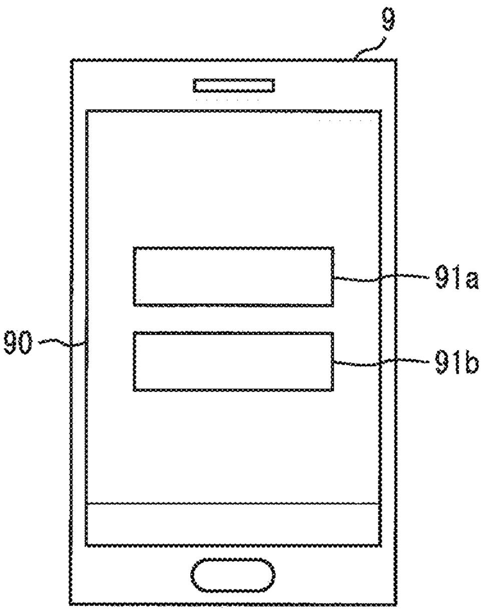
FIG. 12 is a diagram showing an example of the portable terminal, on the display device of which a menu screen is displayed.

FIG. 12 is a diagram showing an example of the portable terminal 9, on the display device 90 of which the menu screen is displayed. In the example shown in FIG. 12, a destination change button 91*a* and a state confirmation button 91*b* are displayed on the display device 90. The destination change button 91*a* and the state confirmation button 91*b* are examples of the input device 91.

Figure 13:
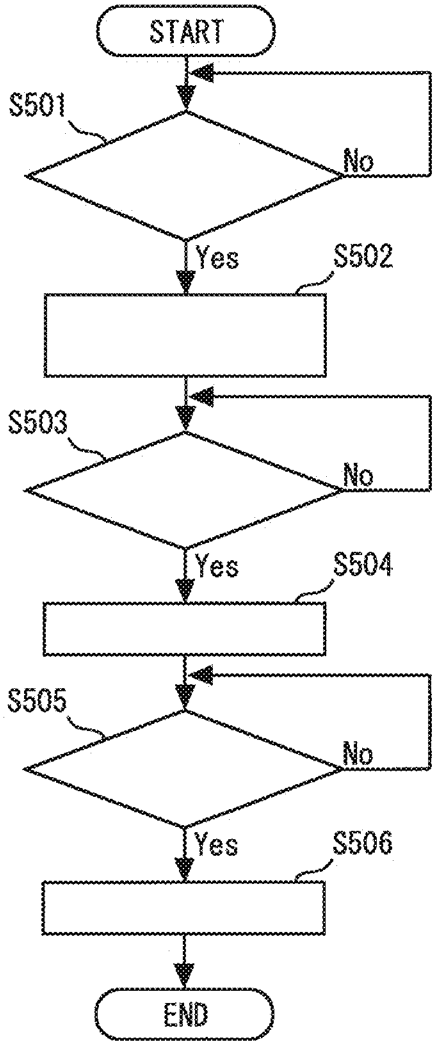
FIG. 13 is a flowchart showing another operation example of the server.

FIG. 13 is a flowchart showing another operation example of the server 6. FIG. 13 shows operations after the display control unit 61 causes the portable terminal 9 to display the menu screen in S309. In the server 6, when the display control unit 61 causes the portable terminal 9 to display the menu screen, it is determined whether a permission floor list acquisition request is received from the portable terminal 9 (S501).

For example, before entering the restricted area, the passage permitted person P1 presses the destination change button 91*a* displayed on the menu screen of the portable terminal 9*a*. Consequently, the permission floor list acquisition request is transmitted from the portable terminal 9*a* to the server 6. When the server 6 receives the permission floor list acquisition request from the portable terminal 9*a*, it is determined Yes in S501. The permission floor list acquisition request includes the token. When it is determined Yes in S501, the communication control unit 62 transmits the received permission floor list acquisition request to the security controller 4 (S502).

Figure 14:
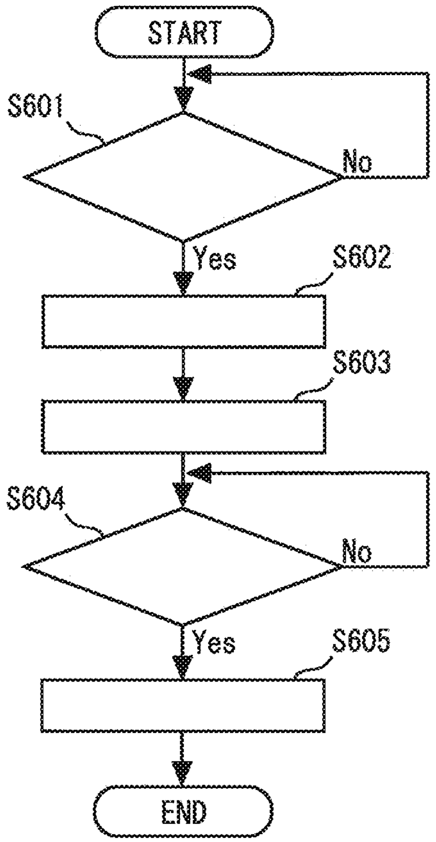
FIG. 14 is a flowchart showing another operation example of the security controller.

FIG. 14 is a flowchart showing another operation example of the security controller 4. In the security controller 4, it is determined whether the permission floor list acquisition request is received from the server 6 (S601). When the security controller 4 receives the permission floor list acquisition request transmitted by the communication control unit 62 in S502, it is determined Yes in S601. When it is determined Yes in S601, the list acquiring unit 48 acquires a permission floor list corresponding to the identification information on the basis of the received permission floor list acquisition request (S602).

For example, when the passage permitted person P1 presses the destination change button 91*a* in the portable terminal 9*a*, the security controller 4 receives the permission floor list acquisition request including the identification information "11001". As explained above, the information concerning the permission floors "first floor, second floor, third floor, seventh floor, eighth floor, and ninth floor" is stored in the storage device 5 in association with the identification information "11001". In such a case, the list acquiring unit 48 acquires, as the permission floor list, a list including the information concerning the first floor, the second floor, the third floor, the seventh floor, the eighth floor, and the ninth floor. When acquiring the permission floor list, the list acquiring unit 48 transmits the acquired permission floor list to the server 6 (S603).

In the server 6, when the communication control unit 62 transmits the permission floor list acquisition request in S502, it is determined whether the permission floor list is received from the security controller 4 as a response to the permission floor list acquisition request (S503). When the server 6 receives the destination floor list transmitted by the list acquiring unit 48 in S603, it is determined Yes in S503. When it is determined Yes in S503, the display control unit 61 causes the display device 90 of the portable terminal 9 to display a selection screen for selecting one out of the plurality of permission floors (S504).

Figure 15:
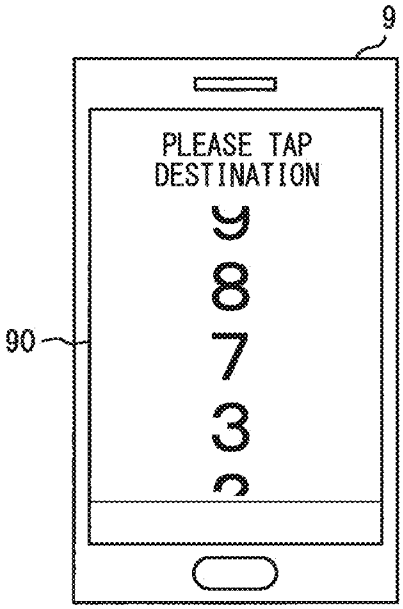
FIG. 15 is a diagram showing an example of the portable terminal, on the display device of which a selection screen is displayed.

FIG. 15 is a diagram showing an example of the portable terminal 9, on the display device 90 of which the selection screen is displayed. FIG. 15 shows an example in which numbers indicating the permission floors are displayed so as to be scrolled up and down. For example, on the selection screen of the portable terminal 9*a*, "9" indicating the ninth floor, "8" indicating the eighth floor, "7" indicating the seventh floor, "3" indicating the third floor, "2" indicating the second floor, and "1" indicating the first floor are displayed. The passage permitted person P1 can select one of the permission floors by tapping a displayed number. In the following explanation, the permission floor selected on the selection screen is described as a permission floor N as well. When one of the permission floors displayed on the selection screen is selected, a destination change request is transmitted from the portable terminal 9 to the server 6. The destination change request includes a token and information concerning the permission floor N.

In the server 6, when the display control unit 61 causes the portable terminal 9 to display the selection screen, it is determined whether the destination change request is received from the portable terminal 9 (S505). When the server 6 receives the destination change request from the portable terminal 9, it is determined Yes in S505. When it is determined Yes in S505, the communication control unit 62 transmits the received destination change request to the security controller 4 (S506).

In the security controller 4, when the list acquiring unit 48 transmits the permission floor list in S603, it is determined whether the destination change request is received from the server 6 as a response to the permission floor list (S604). When the security controller 4 receives the destination change request transmitted by the communication control unit 62 in S506, it is determined Yes in S604. When it is determined Yes in S604, the received destination change request is retained by the retaining unit 42 (S605). For example, when the passage permitted person P1 taps the number 7 on the selection screen, in S605, the destination change request including a token including the identification information "11001" and information indicating the seventh floor, which is one of the permission floors, is retained by the retaining unit 42.

Thereafter, as shown in FIG. 9, the passage permitted person P1 holds the card 32*a* over the reader 30 of the gate 3. When the security controller 4 receives, from the gate 3, the information read by the reader 30 (Yes in S101), the determining unit 40 determines whether the information read by the reader 30 matches any of the identification information stored in the storage device 5 (S102). When it is determined Yes in S102, passage through the gate 3 is permitted (S103).

When it is determined Yes in S102, the determining unit 41 determines whether the destination change request is retained by the retaining unit 42 (S104). When the processing in S605 is performed before the passage permitted person P1 holds the card 32*a* over the reader 30, it is determined Yes in S104. When determining Yes in S104, the determining unit 41 determines one of the permission floors as a destination floor on the basis of the destination change request retained by the retaining unit 42 (S106). That is, the determining unit 41 determines the permission floor N as the destination floor. In the example explained above, in S106, the determining unit 41 determines that a destination floor corresponding to the identification information "11001" is the seventh floor.

The requesting unit 43 requests the group controller 1 to perform call registration for the destination floor determined by the determining unit 41 (S107). When the determining unit 41 determines Yes in S104, the requesting unit 43 requests the group controller 1 to perform call registration for the permission floor N. This request includes, for example, the identification information "11001", information concerning the boarding floor "first floor", and information concerning the destination floor "seventh floor".

Thereafter, when the security controller 4 receives information concerning an assigned car from the group controller 1 (Yes in S108), the display control unit 44 causes the display device 31 to display the received information concerning the assigned car (S109). The passage permitted person P1 can learn, by viewing the display device 31 when passing through the gate 3, the car 20 that the passage permitted person P1 should board. For example, "D" indicating the elevator D is displayed on the display device 31. After passing through the gate 3, the passage permitted person P1 moves to the hall and boards the car 20D from a door, above which "D" is displayed.

Note that, for example, when a request for call registration based on the destination change request is transmitted to the group controller 1, the destination change request retained by the retaining unit 42 is deleted from the retaining unit 42. The destination change request retained by the retaining unit 42 may be deleted from the retaining unit 42 after a fixed time elapses.

In the example explained in this embodiment, the passage permitted person can register, by holding the card 32 over the reader 30 of the gate 3, a call for the normal use floor registered in advance. Furthermore, the passage permitted person can change the destination floor by selecting one of the permission floors on the selection screen before passing through the gate 3. Note that a request for call registration for the selected permission floor is not transmitted to the group controller 1 until the passage permitted person holds the card 32 over the reader 30. Accordingly, the call registration is not performed for a person not permitted to pass through the gate 3. The call registration is not performed even for the passage permitted person whose identification information of the card 32 is not read by the reader 30. Accordingly, in a building and the like where security control is performed, security and convenience are not spoiled.

This system can be constructed using an existing system. For example, this system can be applied to the existing system without changing the exteriors of the gate 3 and the hall.

Figure 16:
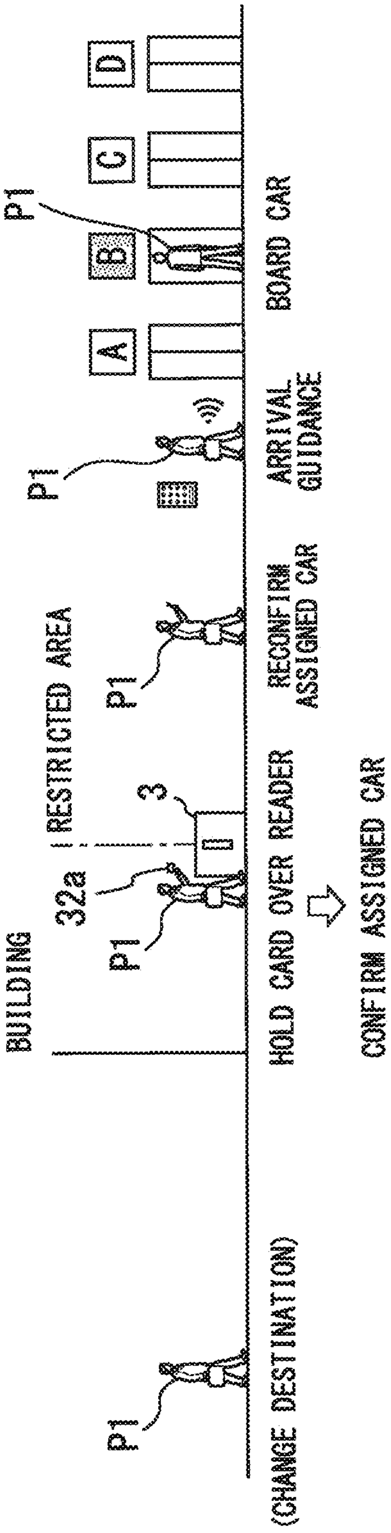
FIG. 16 is a diagram for explaining another example of the actions performed by the passage permitted person when coming to work.

Other functions adoptable by this system are explained below. This system may adopt a plurality of functions explained below in combination. First, an example in which the passage permitted person P1 confirms an assigned car after passing through the gate 3 is explained with reference to FIG. 16 to FIG. 18 as well. FIG. 16 is a diagram for explaining another example of the actions performed by the passage permitted person P1 when coming to work. The passage permitted person P1 may operate the portable terminal 9 before entering the restricted area to change a destination floor.

Figure 17:
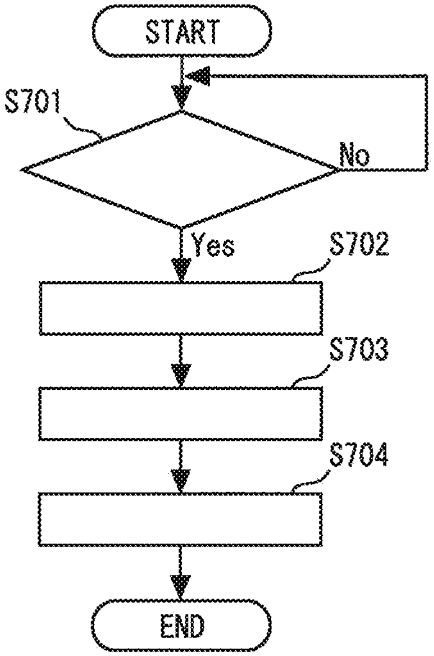
FIG. 17 is a flowchart showing another operation example of the server.

FIG. 17 is a flowchart showing another operation example of the server 6. FIG. 17 shows operations after the display control unit 61 causes the portable terminal 9 to display the menu screen in S309. In the server 6, when the display control unit 61 causes the portable terminal 9 to display the menu screen, it is determined whether a state confirmation request is received from the portable terminal 9 (S701).

For example, after entering the restricted area, the passage permitted person P1 presses the state confirmation button 91*b* displayed on the menu screen of the portable terminal 9*a*. Consequently, a state confirmation request is transmitted from the portable terminal 9*a* to the server 6. When the server 6 receives the state confirmation request from the portable terminal 9*a*, it is determined Yes in S701. A token is included in the state confirmation request.

When it is determined Yes in S701, the specifying unit 63 specifies, on the basis of the received state confirmation request, the assigned car corresponding to the identification information (S702). As explained above, in S108, the security controller 4 receives information concerning the assigned car from the group controller 1. For example, when receiving the state confirmation request from the portable terminal 9, the specifying unit 63 acquires information concerning the assigned car corresponding to the identification information from the security controller 4. That is, the security controller 4 provides the information concerning the assigned car to the server 6 in response to an inquiry from the specifying unit 63. The security controller 4 may transfer the information concerning the assigned car to the server 6 every time the security controller 4 receives the information from the group controller 1. In such a case, the server 6 temporarily retains the received information concerning the assigned car.

When it is determined Yes in S701, the specifying unit 64 specifies a state of the assigned car corresponding to the identification information on the basis of the received state confirmation request (S703). In S703, the specifying unit 64 specifies information such as the position, the traveling direction, and a door open/close state of the assigned car. For example, when receiving the state confirmation request from the portable terminal 9, the specifying unit 64 acquires information indicating the state of the assigned car from the group controller 1. That is, the group controller 1 provides, in response to an inquiry from the specifying unit 64, information indicating a state of the car 20 corresponding to the inquiry to the server 6. The group controller 1 may periodically transmit information indicating states of the cars 20 to the server 6. In such a case, the server 6 temporarily retains the received information.

Figure 18:
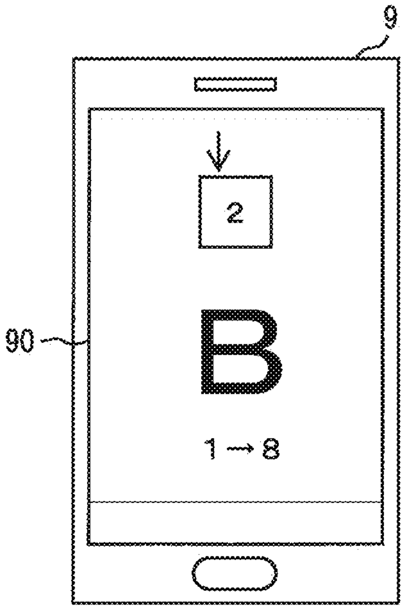
FIG. 18 is a diagram showing an example of the portable terminal, on the display device of which a state confirmation screen is displayed.

The display control unit 61 causes the display device 90 of the portable terminal 9 which transmitted the state confirmation request in S701 to display a state confirmation screen (S704). FIG. 18 is a diagram showing an example of the portable terminal 9, on the display device 90 of which the state confirmation screen is displayed. The state confirmation screen includes, for example, the information concerning the assigned car specified by the specifying unit 63 and the information indicating the state of the assigned car specified by the specifying unit 64. In the examples shown in FIG. 16 to FIG. 18, even when the passage permitted person P1 forgets which car 20 the passage permitted person P1 should board after passing through the gate 3, the passage permitted person P1 can reconfirm the assigned car on the portable terminal 9*a*. Note that, in the example explained in this embodiment, the menu screen also functions as the confirmation request screen for requesting the state confirmation for the assigned car.

As shown in FIG. 16 and the like, when the assigned car arrives at the hall, arrival guidance may be performed from the portable terminal 9.

Figure 19:
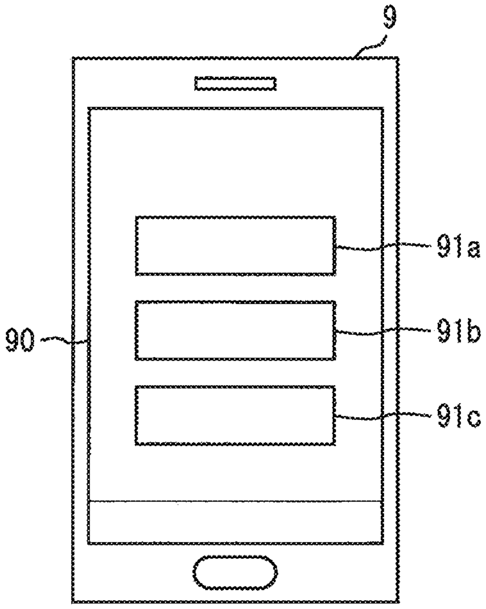
FIG. 19 is a diagram showing another example of the menu screen.

Next, an example in which the passage permitted person P1 designates a boarding floor and a destination floor from the portable terminal 9*a* is explained with reference to FIG. 19 to FIG. 23 as well. FIG. 19 is a diagram showing another example of the menu screen. In the example shown in FIG. 19, a destination change button 91*a*, a state confirmation button 91*b*, and a route designation button 91*c* are displayed on the display device 90. The destination change button 91*a*, the state confirmation button 91*b*, and the route designation button 91*c* are examples of the input device 91.

Figure 20:
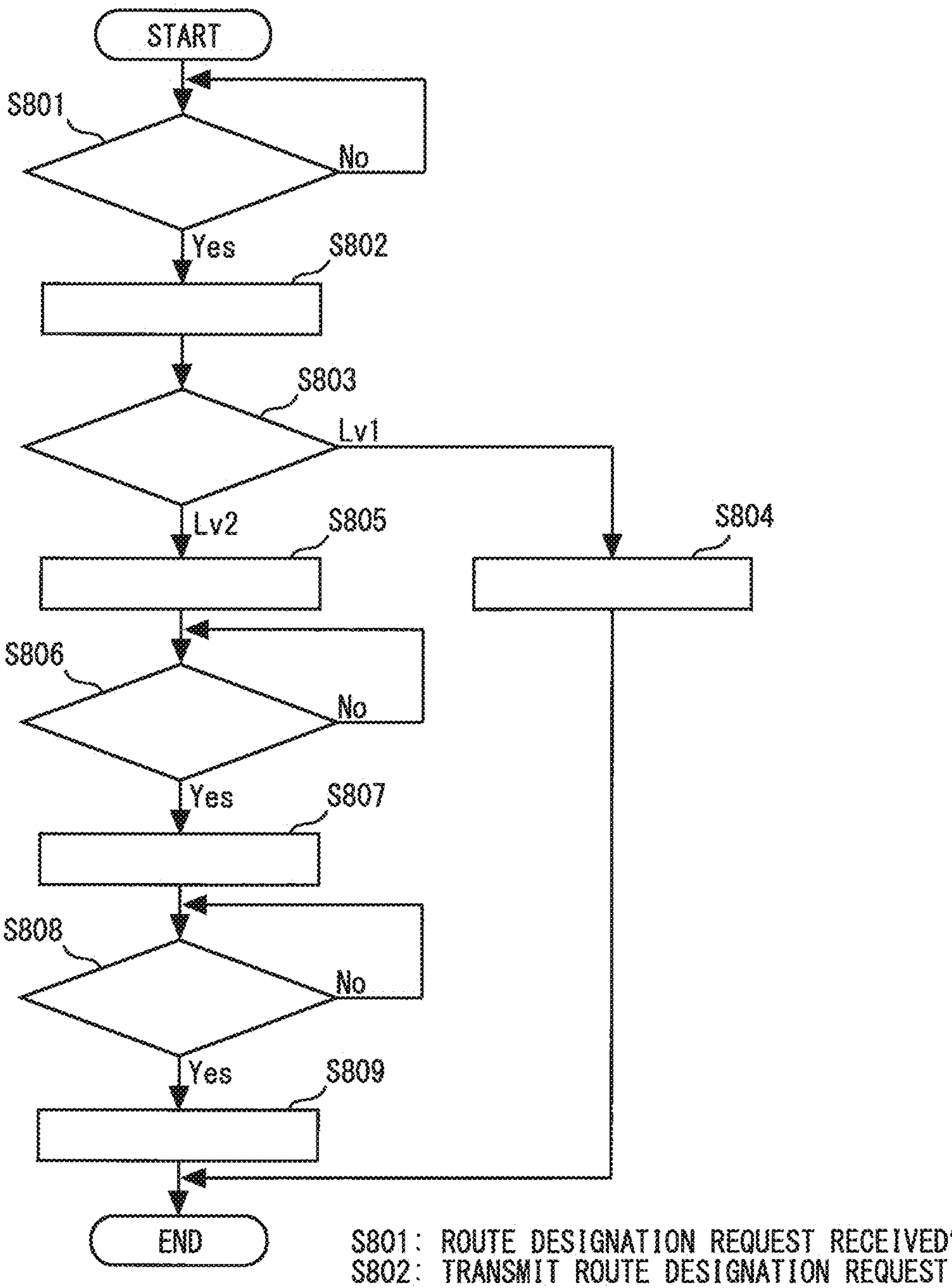
FIG. 20 is a flowchart showing another operation example of the server.

FIG. 20 is a flowchart showing another operation example of the server 6. FIG. 20 shows operations after the display control unit 61 causes the portable terminal 9 to display the menu screen in S309. In the server 6, when the display control unit 61 causes the portable terminal 9 to display the menu screen, it is determined whether a route designation request is received from the portable terminal 9 (S801).

Figure 21:
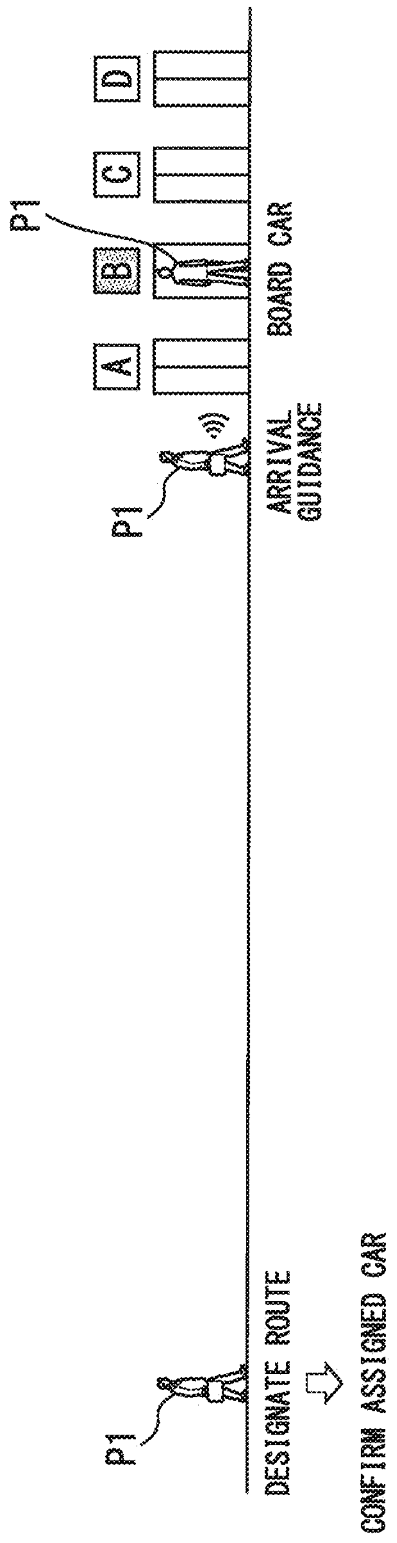
FIG. 21 is a diagram for explaining an example of actions performed by the passage permitted person after coming to work.

FIG. 21 is a diagram for explaining an example of actions performed by the passage permitted person P1 after coming to work. For example, after entering the restricted area, the passage permitted person P1 presses the route designation button 91*c* displayed on the menu screen of the portable terminal 9*a*. For example, the passage permitted person P1 presses the route designation button 91*c* in the eighth floor where the office of the passage permitted person P1 is present. Consequently, the route designation request is transmitted from the portable terminal 9*a* to the server 6. The route designation request includes a token. When the server 6 receives the route designation request from the portable terminal 9*a*, it is determined Yes in S801. When it is determined Yes in S801, the communication control unit 62 transmits the received route designation request to the security controller 4 (S802).

Figure 22:
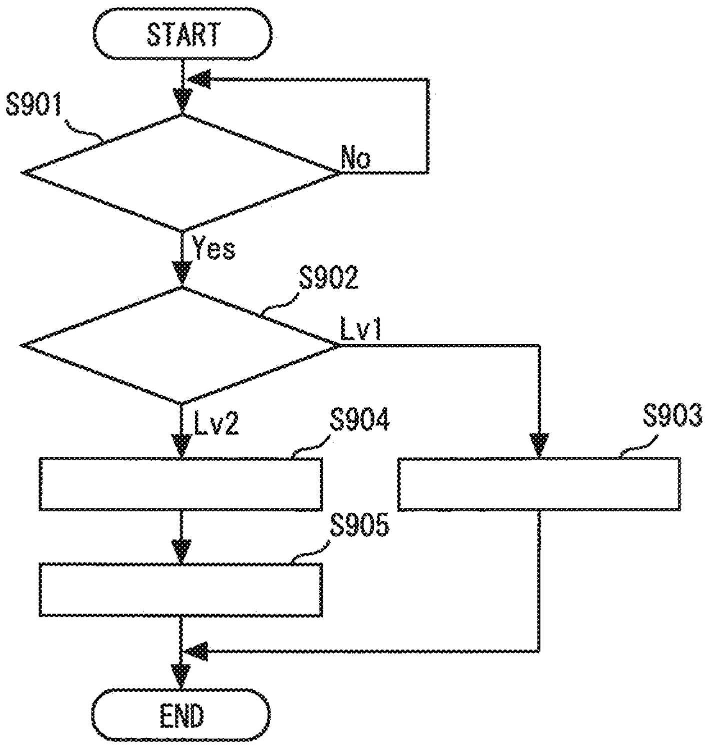
FIG. 22 is a flowchart showing another operation example of the security controller.

FIG. 22 is a flowchart showing another operation example of the security controller 4. In the security controller 4, it is determined whether the route designation request is received from the server 6 (S901). When the security controller 4 receives the route designation request transmitted by the communication control unit 62 in S802, it is determined Yes in S901. When it is determined Yes in S901, the determining unit 49 determines a present security level of an individual to whom the identification information is imparted (S902). For example, the determining unit 49 determines a present security level of the passage permitted person P1.

In the examples shown in FIG. 19 to FIG. 23, one or a plurality of gates 3 are installed such that the passage permitted person always passes through the gate 3 when entering and exiting the restricted area. That is, the passage permitted person cannot enter the restricted area unless the passage permitted person passes through the gate 3. The passage permitted person cannot exit the restricted area unless the passage permitted person passes through the gate 3. The determining unit 49 determines, on the basis of the information read by the readers 30, whether the passage permitted person is present in the restricted area. For example, when the security controller 4 receives the route designation request including the identification information "11001" in S901, the determining unit 49 determines whether the passage permitted person P1 is present in the restricted area.

When the passage permitted person is absent in the restricted area, the determining unit 49 determines that a security level of the passage permitted person is a level 1. When determining that the security level of the passage permitted person is the level 1, the determining unit 49 transmits level 1 information to the server 6 (S903).

When the passage permitted person is present in the restricted area, the determining unit 49 determines that a security level of the passage permitted person is a level 2. When the determining unit 49 determines that the security level of the passage permitted person is the level 2, the list acquiring unit 48 acquires a permission floor list corresponding to the identification information on the basis of the received route designation request (S904).

For example, when the passage permitted person P1 presses the route designation button 91*c* in the portable terminal 9*a*, the security controller 4 receives a route designation request including the identification information "11001". In such a case, the list acquiring unit 48 acquires, as a permission floor list, a list including information concerning the first floor, the second floor, the third floor, the seventh floor, the eighth floor, and the ninth floor. When acquiring the permission floor list, the list acquiring unit 48 transmits the acquired permission floor list to the server 6 (S905).

In the server 6, when the communication control unit 62 transmits the route designation request in S802, a security level of the passage permitted person is determined (S803). As explained above, when the determining unit 49 determines that the security level of the passage permitted person is the level 1, the level 1 information is transmitted from the security controller 4 to the server 6. When the server 6 receives the level 1 information after S802, the display control unit 61 causes the display device 90 of the portable terminal 9 to display, for example, an error screen (S804).

On the other hand, when the determining unit 49 determines that the security level of the passage permitted person is the level 2, a permission floor list is transmitted from the security controller 4 to the server 6. When the server 6 receives the permission floor list after S802, the display control unit 61 causes the display device 90 of the portable terminal 9 to display a route designation screen (S805). The route designation screen is a screen for designating a route for moving from one to another among a plurality of permission floors included in the permission floor list.

Figure 23:
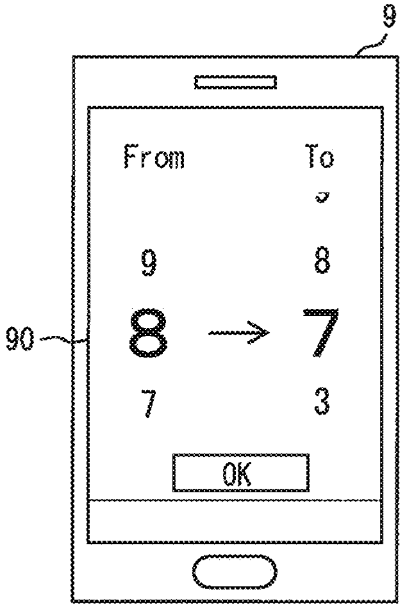
FIG. 23 is a diagram showing an example of the portable terminal, on the display device of which a route designation screen is displayed.

FIG. 23 is a diagram showing an example of the portable terminal 9, on the display device 90 of which the route designation screen is displayed. FIG. 23 shows an example in which numbers indicating permission floors are scrolled up and down and displayed in a field of "From" indicating a boarding floor and a field of "To" indicating a destination floor. For example, the passage permitted person P1 can select one of the permission floors as the boarding floor by arranging, according to an arrow, a number displayed in the field of "From". The passage permitted person P1 can select another one of the permission floors as the destination floor by arranging, according to the arrow, a number displayed in the field of "To".

For example, the passage permitted person P1 presses an OK button after arranging a number 8 on the left side of the arrow and arranging a number 7 on the right side of the arrow. Consequently, a route change request is transmitted from the portable terminal 9*a* to the server 6. The route change request includes a token and information concerning a route designated on the route designation screen. The information concerning the route includes information concerning the permission floor selected as the boarding floor and information concerning the permission floor selected as the destination floor.

In the server 6, when the display control unit 61 causes the portable terminal 9 to display the route designation screen, it is determined whether the route change request is received from the portable terminal 9 (S806). When the server 6 receives the route change request from the portable terminal 9, it is determined Yes in S806. When it is determined Yes in S806, the requesting unit 65 requests the group controller 1 to perform call registration for a route designated on the route designation screen (S807). This request includes, for example, the identification information "11001", information concerning the boarding floor "eighth floor", and information concerning the destination floor "seventh floor".

In the group controller 1, when the request for the call registration is received from the server 6, the processing shown in S202 to S204 is performed. When the assigning unit 10 determines an assigned car in response to the call registration request, the information providing unit 12 transmits information concerning the assigned car to a request source of the call registration (S204). For example, the information providing unit 12 transmits, to the server 6, information to the effect that the assigned car corresponding to the identification information "11001" is the car 20B.

In the server 6, when the requesting unit 65 requests the call registration in S807, it is determined whether the information concerning the assigned car is received from the group controller 1 as a response to the request (S808). When the server 6 receives the information concerning the assigned car transmitted by the information providing unit 12 in S204, it is determined Yes in S808. When it is determined Yes in S808, the display control unit 61 causes the display device 90 of the portable terminal 9 which transmitted the route change request in S806 to display the received information concerning the assigned car (S809). After designating a route on the route designation screen, the passage permitted person P1 can learn, by viewing the display device 90 of the portable terminal 9*a*, the car 20 that the passage permitted person P1 should board. For example, "B" indicating the elevator B is displayed on the display device 90. The passage permitted person P1 moves to a hall in the eighth floor and boards the car 20B from a door, above which "B" is displayed.

Next, another example in which the passage permitted person P1 designates a boarding floor and a destination floor from the portable terminal 9*a* is explained with reference to FIG. 24 and FIG. 25 as well. In the example shown in FIG. 19 to FIG. 23, the passage permitted person P1 can designate a route wherever the passage permitted person P1 is present in the restricted area. For example, even if the passage permitted person P1 is present in a place far from the hall in the eighth floor, the passage permitted person P1 can designate, from the portable terminal 9*a*, a route for moving from the eighth floor to the seventh floor. Considering such a situation, an example in which a request for call registration can be performed using a timer function is explained with reference to FIG. 24 and FIG. 25.

Figure 24:
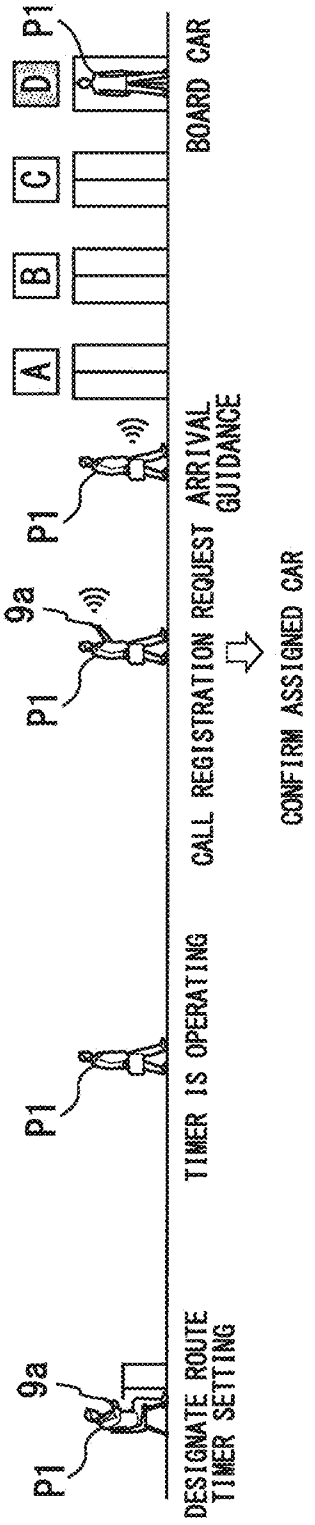
FIG. 24 is a diagram for explaining another example of actions performed by the passage permitted person after coming to work.

FIG. 24 is a diagram for explaining another example of actions performed by the passage permitted person P1 after coming to work. The operation of the server 6 is basically the same as the operation shown in FIG. 20. For example, the server 6 performs the same processing as the processing shown in S801 to S804. On the other hand, when the server 6 receives the permission floor list after S802, in S805, the display control unit 61 causes the display device 90 of the portable terminal 9 to display a route designation screen and a timer setting screen.

For example, first, the display control unit 61 causes the portable terminal 9 to display the route designation screen shown in FIG. 23. When the OK button displayed on the route designation screen is pressed, the display control unit 61 causes the portable terminal 9 to display the timer setting screen.

Figure 25:
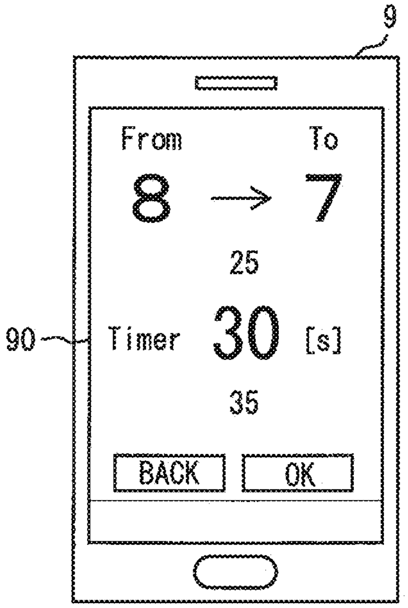
FIG. 25 is a diagram showing an example of the portable terminal, on the display device of which a timer setting screen is displayed.

FIG. 25 is a diagram showing an example of the portable terminal 9, on the display device 90 of which the timer setting screen is displayed. FIG. 25 shows an example in which numbers indicating the number of seconds are displayed so as to be scrolled up and down. By pressing an OK button after arranging a desired number next to the description "Timer", the passage permitted person P1 can set a time until call registration is performed. The OK button on the timer setting screen is pressed, whereby a route change request is transmitted from the portable terminal 9*a* to the server 6. The route change request includes a token, information concerning a route designated on the route designation screen, and information concerning a time set on the timer setting screen.

In the server 6, when the display control unit 61 causes the portable terminal 9 to display the route designation screen and the timer setting screen, it is determined whether the route change request is received from the portable terminal 9 (S806). When the server 6 receives the route change request from the portable terminal 9, it is determined Yes in S806. When it is determined Yes in S806, after the time set on the timer setting screen elapses, the requesting unit 65 requests the group controller 1 to perform call registration for the route designated on the route designation screen (S807).

In the server 6, when the requesting unit 65 requests the call registration in S807, it is determined whether the information concerning the assigned car is received from the group controller 1 as a response to the request (S808). When it is determined Yes in S808, the display control unit 61 causes the display device 90 of the portable terminal 9 which transmitted the route change request in S806 to display the received information concerning the assigned car (S809). In the portable terminal 9, when the information concerning the assigned car is displayed on the display device 90, notification by sound or vibration may be performed.

For example, the passage permitted person P1 starts movement to the hall after pressing the OK button displayed on the timer setting screen. At this time, if the time set on the timer setting screen does not elapse, the request for the call registration is not performed. The passage permitted person P1 can approach the hall before the request for the call registration is started. The passage permitted person P1 only has to set, on the timer setting screen, a time corresponding to the distance to the hall.

Figure 26:
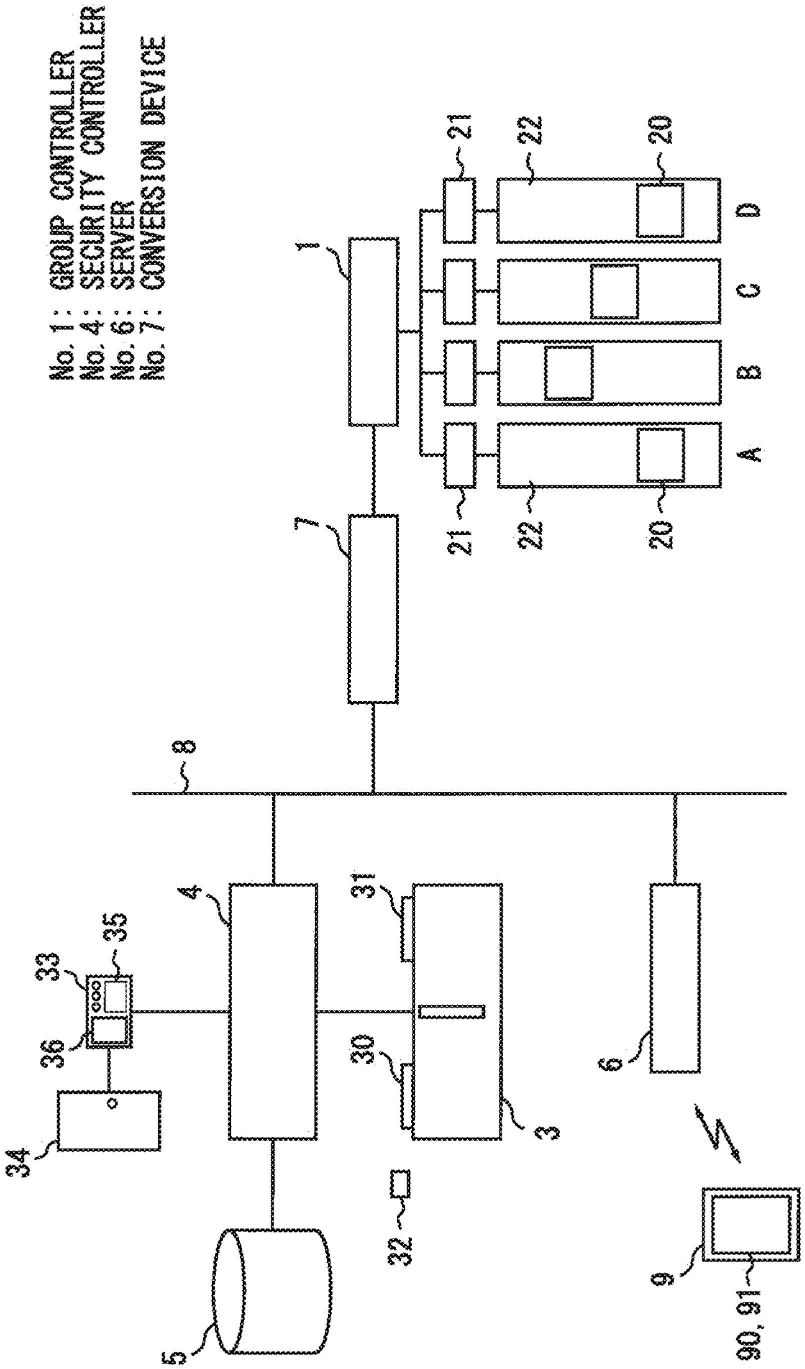
FIG. 26 is a diagram showing another example of the call registration system.

Next, an example in which the call registration is performed by another method is explained with reference to FIG. 26 to FIG. 28 as well. FIG. 26 is a diagram showing another example of the call registration system. The example shown in FIG. 26 is different from the example shown in FIG. 1 in that the security controller 4 performs room entrance and exit control. In the example shown in FIG. 26, the call registration system further includes an electronic lock controller 33.

The electronic lock controller 33 performs locking and unlocking of a door 34 for entering a room. The electronic lock controller 33 is provided in the restricted area. The electronic lock controller 33 is used to further divide a specific area in the restricted area. The electronic lock controller 33 includes, for example, a reader 35 and a display device 36. The reader 35 reads identification information from a storage medium such as an employee ID card. For example, the reader 35 reads identification information from the card 32.

The security controller 4 controls the electronic lock controller 33. For example, the security controller 4 controls a plurality of electronic lock controllers 33 on the basis of information stored in the storage device 5.

Figure 27:
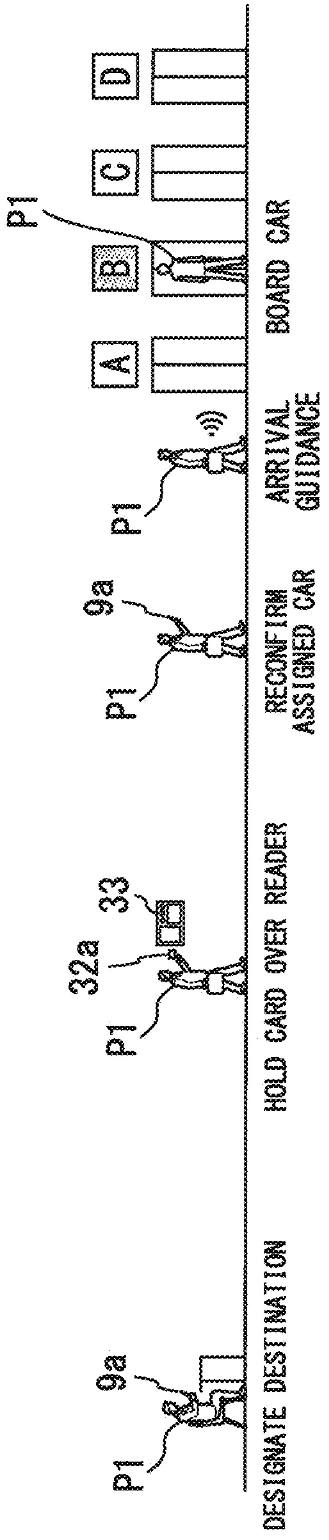
FIG. 27 is a diagram for explaining another example of actions performed by the passage permitted person after coming to work.

FIG. 27 is a diagram for explaining another example of actions performed by the passage permitted person P1 after coming to work. For example, in the office of the passage permitted person P1, the passage permitted person P1 presses the destination change button 91*a* displayed on the menu screen of the portable terminal 9*a*. In the server 6, the operation shown in FIG. 13 is performed. In the security controller 4, the operation shown in FIG. 14 is performed. Consequently, in S605, a destination change request including a token including the identification information "11001" and information indicating the permission floor N is retained by the retaining unit 42. Thereafter, as shown in FIG. 27, the passage permitted person P1 holds the card 32*a* over the reader 35 of the electronic lock controller 33.

Figure 28:
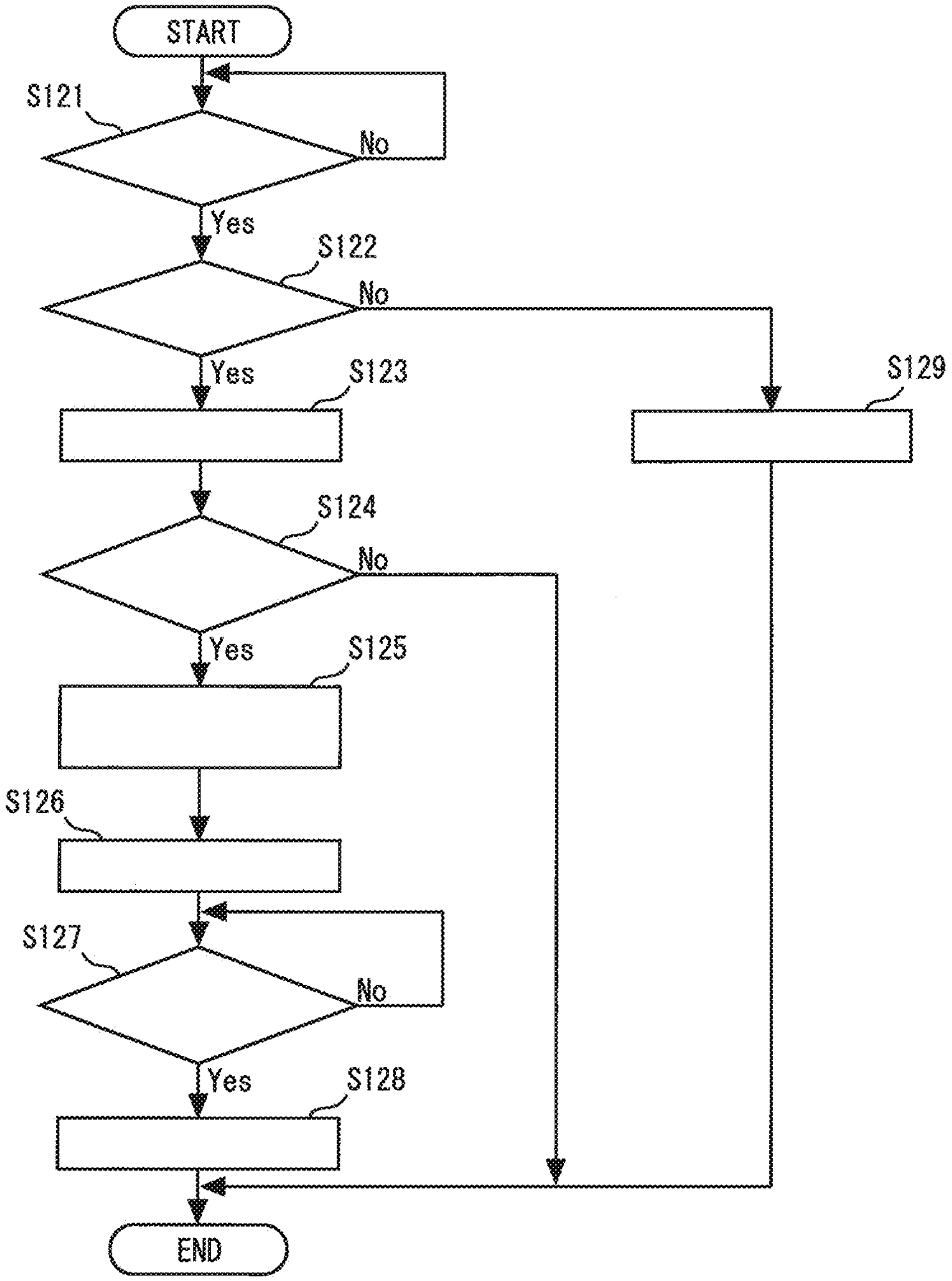
FIG. 28 is a flowchart showing another operation example of the security controller.

FIG. 28 is a flowchart showing another operation example of the security controller 4. In the security controller 4, it is determined whether identification information is received from the electronic lock controller 33 (S121). When the passage permitted person P1 holds the card 32*a* over the reader 35, the reader 35 reads the identification information "11001" from the card 32*a*. The information read by the reader 35 is transmitted to the security controller 4. When the security controller 4 receives the information read by the reader 35 from the electronic lock controller 33, it is determined Yes in S121.

The determining unit 40 determines whether the information read by the reader 35 matches any of identification information associated with the reader 35 among the identification information stored in the storage device 5 (S122). When it is determined No in S122, the passage through the door 34 is not permitted (S129). For example, the operation control unit 45 does not unlock the door 34. The display control unit 44 causes the display device 36 to display to the effect that passage is not permitted.

When it is determined Yes in S122, passage through the door 34 is permitted (S123). For example, the operation control unit 45 unlocks the door 34.

When the determining unit 40 determines that the information read by the reader 35 matches the identification information stored in the storage device 5 (Yes in S122), the determining unit 41 determines a destination floor of the passage permitted person according to necessity. Specifically, the determining unit 41 determines whether a destination change request is retained by the retaining unit 42 (S124). When it is determined No in S124, the processing ends. When it is determined No in S124, a request for call registration is not performed.

On the other hand, when determining Yes in S124, the determining unit 41 determines one of the permission floors as the destination floor on the basis of the destination change request retained by the retaining unit 42 (S125). That is, the determining unit 41 determines the permission floor N as the destination floor.

The requesting unit 43 requests the group controller 1 to perform call registration for the destination floor determined by the determining unit 41 (S126). That is, when the determining unit 41 determines Yes in S124, the requesting unit 43 requests the group controller 1 to perform call registration for the permission floor N. This request includes, for example, the identification information, information concerning a boarding floor, and information concerning the destination floor. The boarding floor is, for example, a floor where the electronic lock controller 33 is installed. Note that, in the group controller 1, when the requesting unit 43 receives the request transmitted in S126, the operation shown in FIG. 7 is performed.

Thereafter, when the security controller 4 receives information concerning an assigned car from the group controller 1 (Yes in S127), the display control unit 44 causes the display device 36 to display the received information concerning the assigned car (S128). The passage permitted person P1 can learn, by viewing the display device 36, the car 20 that the passage permitted person P1 should board. In the example shown in FIG. 26 to FIG. 28 as well, the passage permitted person P1 can confirm the assigned car from the portable terminal 9*a* after passing through the door 34. When the assigned car arrives at a hall, arrival guidance may be performed from the portable terminal 9.

Figure 29:
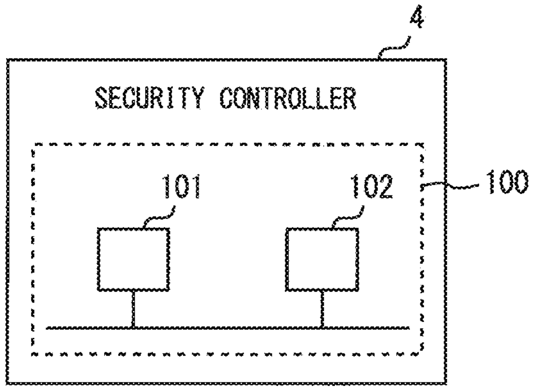
FIG. 29 is a diagram showing an example of hardware resources of the security controller.

In this embodiment, units indicated by signs 40 to 49 indicate functions of the security controller 4. FIG. 29 is a diagram showing an example of hardware resources of the security controller 4. The security controller 4 includes, as a hardware resource, for example, processing circuitry 100 including a processor 101 and a memory 102. The security controller 4 realizes the functions of the units indicated by signs 40 to 49 by executing programs stored in the memory 102 with the processor 101.

The processor 101 is also called a CPU (Central Processing Unit), a central processing device, a processing device, an arithmetic device, a microprocessor, a microcomputer, or a DSP. As the memory 102, a semiconductor memory, a magnetic disk, a flexible disk, an optical disk, a compact disc, a minidisc, or a DVD may be adopted. The adoptable semiconductor memory includes a RAM, a ROM, a flash memory, an EPROM, and an EEPROM.

Figure 30:
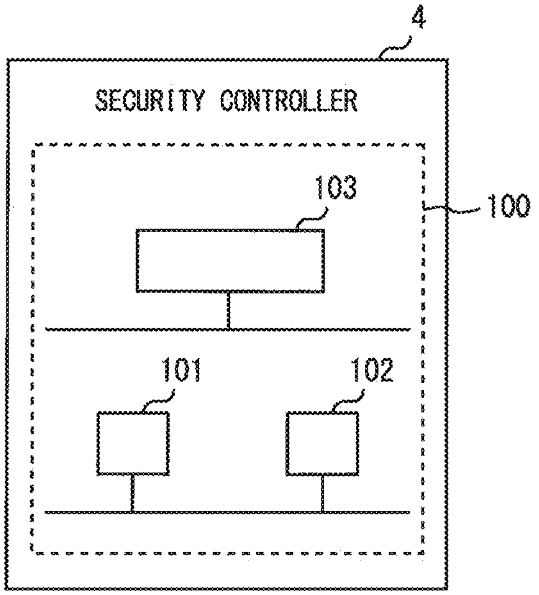
FIG. 30 is a diagram showing another example of the hardware resources of the security controller.

FIG. 30 is a diagram showing another example of the hardware resources of the security controller 4. In the example shown in FIG. 30, the security controller 4 includes, for example, the processing circuitry 100 including the processor 101, the memory 102, and dedicated hardware 103. FIG. 30 shows an example in which a part of the functions of the security controller 4 is realized by the dedicated hardware 103. All of the functions of the security controller 4 may be realized by the dedicated hardware 103. As the dedicated hardware 103, a single circuit, a composite circuit, a programmed processor, a parallel-programmed processor, an ASIC, or an FPGA or a combination of the forgoing can be adopted.

Similarly, units indicated by signs 10 to 12 indicate functions of the group controller 1. Hardware resources of the group controller 1 are the same as those in the example shown in FIG. 29. The group controller 1 includes, as a hardware resource, for example, processing circuitry including a processor and a memory. The group controller 1 realizes the functions of the units indicated by signs 10 to 12 by executing programs stored in the memory with the processor. The group controller 1 may include, as a hardware resource, processing circuitry including a processor, a memory, and dedicated hardware. All of the functions of the group controller 1 may be realized by the dedicated hardware.

Similarly, units indicated by signs 60 to 65 indicate functions of the server 6. Hardware resources of the server 6 are the same as those in the example shown in FIG. 29. The server 6 includes, as a hardware resource, for example, processing circuitry including a processor and a memory. The server 6 realizes the functions of the units indicated by signs 60 to 65 by executing programs stored in the memory with the processor. The server 6 may include, as a hardware resource, processing circuitry including a processor, a memory, and dedicated hardware. All of the functions of the server 6 may be realized by the dedicated hardware.

INDUSTRIAL APPLICABILITY

The present invention can be applied to a system that performs security control for a restricted area.

REFERENCE SIGNS LIST

1 group controller, 3 gate, 4 security controller, 5 storage device, 6 server, 7 conversion device, 8 network, 9 portable terminal, 10 assigning unit, 11 operation managing unit, 12 information providing unit, 20 car, 21 controller, 22 shaft, 30 reader, 31 display device, 32 card, 33 electronic lock controller, 34 door, 35 reader, 36 display device, 40 determining unit, 41 determining unit, 42 retaining unit, 43 requesting unit, 44 display control unit, 45 operation control unit, 46 determining unit, 57 imparting unit, 48 list acquiring unit, 49 determining unit, 60 determining unit, 61 display control unit, 62 communication control unit, 63 specifying unit, 64 specifying unit, 65 requesting unit, 90 display device, 91 input device, 100 processing circuitry, 101 processor, 102 memory, 103 dedicated hardware

The invention claimed is:

1. A call registration system comprising:

a collation device including a first reader;

a security controller that controls the collation device;

a server that communicates with the security controller; and a storage device that stores information concerning a normal use floor, information concerning a plurality of permission floors, and collation information in corresponding to identification information, wherein the server includes first circuitry to cause a portable terminal to display an input screen, the security controller includes second circuitry to, when information input on the input screen matches collation information stored in the storage device, impart authorization information corresponding to the identification information to the portable terminal via the server, the first circuitry is configured to cause the portable terminal, to which the authorization information is imparted, to display a selection screen for selecting one out of the plurality of permission floors stored in the storage device, and the second circuitry is configured:

to retain information concerning a permission floor selected on the selection screen;

to, when information read by the first reader matches the identification information, determine whether information concerning the selected permission floor is retained; and to, when it is determined that the information concerning the selected permission floor is not retained, request an elevator group controller to perform call registration for the normal use floor stored in the storage device and, when it is determined that the information concerning the selected permission floor is retained, request the group controller to perform call registration for the selected permission floor.

2. The call registration system according to claim 1, wherein the collation device further includes a display device, and the second circuitry is configured to, when the group controller determines an assigned car for the requested call registration, cause the display device to display information concerning the assigned car.

3. The call registration system according to claim 2, wherein the first circuitry is configured:

to cause the portable terminal, to which the authorization information is imparted, to display a confirmation request screen for requesting state confirmation for the assigned car;

to specify the assigned car when the request for the state confirmation is performed on the confirmation request screen;

to specify a state of the assigned car when the request for the state confirmation is performed on the confirmation request screen; and to cause the portable terminal, which is requested to perform the state confirmation on the confirmation request screen, to display information concerning the specified assigned car and information indicating the specified state of the assigned car.

4. The call registration system according to claim 1, wherein the second circuitry is configured:

to determine whether an individual, to whom the identification information is imparted, is present in a specific restricted area; and to, when the second circuitry determines that the individual is present in the restricted area, cause the portable terminal, to which the authorization information is imparted, to display a route designation screen for designating a route for moving from one to another one of the plurality of permission floors, and the first circuitry is configured to request the group controller to perform call registration for the route designated on the route designation screen.

5. The call registration system according to claim 4, wherein the first circuitry is configured:

to, when the second circuitry determines that the individual is present in the restricted area, cause the portable terminal, to which the authorization information is imparted, to display a timer setting screen; and to, after a time set on the timer setting screen elapses, request the group controller to perform call registration for the route designated on the route designation screen.

6. The call registration system according to claim 1, further comprising an electronic lock controller that includes a second reader and unlocks and locks a door, wherein the second circuitry is configured:

to, when information read by the second reader matches the identification information, determine whether the information concerning the selected permission floor is retained; and to, when the information read by the second reader matches the identification information and it is determined that the information concerning the selected permission floor is retained, request the group controller to perform call registration for the selected permission floor.

* * * * *